United States Patent
Morota et al.

(10) Patent No.: US 7,299,035 B2
(45) Date of Patent: Nov. 20, 2007

(54) SERVER DEVICE, MOBILE COMMUNICATIONS TERMINAL, INFORMATION TRANSMITTING SYSTEM AND INFORMATION TRANSMITTING METHOD

(75) Inventors: Satoru Morota, Yokohama (JP); Yasutaka Urakawa, Yokohama (JP); Tatsuya Kato, Yokohama (JP); Kenji Ishii, Yokohama (JP); Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 255 days.

(21) Appl. No.: 10/346,116

(22) Filed: Jan. 17, 2003

(65) Prior Publication Data
US 2003/0157930 A1 Aug. 21, 2003

(30) Foreign Application Priority Data
Jan. 17, 2002 (JP) .............................. 2002-009030

(51) Int. Cl.
*H04M 3/00* (2006.01)
(52) U.S. Cl. ..................... 455/418; 455/414.1; 709/246
(58) Field of Classification Search ................ 455/418, 455/557, 419; 705/39, 1; 707/102; 709/229, 709/246, 219, 507; 713/181, 200
See application file for complete search history.

(56) References Cited

U.S. PATENT DOCUMENTS

| | | | |
|---|---|---|---|
| 6,349,204 B1 * | 2/2002 | Goetz et al. ................. | 455/419 |
| 2001/0037344 A1 | 11/2001 | Haji et al. | |
| 2001/0051916 A1 * | 12/2001 | Shiomi et al. ................ | 705/39 |
| 2002/0099718 A1 * | 7/2002 | Inami et al. ................. | 707/102 |
| 2002/0124181 A1 * | 9/2002 | Nambu ........................ | 713/200 |
| 2002/0132607 A1 * | 9/2002 | Castell et al. ................ | 455/412 |
| 2002/0194379 A1 * | 12/2002 | Bennett et al. ............. | 709/246 |
| 2003/0105973 A1 * | 6/2003 | Liang et al. ................. | 713/200 |
| 2003/0120812 A1 * | 6/2003 | Nitta ........................... | 709/246 |
| 2003/0157963 A1 * | 8/2003 | Collot ......................... | 455/557 |
| 2003/0216927 A1 * | 11/2003 | Sridhar et al. ................. | 705/1 |
| 2004/0054911 A1 * | 3/2004 | Chennakeshu et al. ..... | 713/181 |
| 2004/0139204 A1 * | 7/2004 | Ergezinger et al. ......... | 709/229 |

FOREIGN PATENT DOCUMENTS

EP 1 184 772 3/2002

(Continued)

OTHER PUBLICATIONS

F-Secure Corporation, XP-002220984, pp. 1-2, "F-Secure Announces World's First Anti-Virus Product for Wierless Information Devices", Aug. 9, 2000.

*Primary Examiner*—Joseph Feild
*Assistant Examiner*—Phuoc Doan
(74) *Attorney, Agent, or Firm*—Oblon, Spivak, McClelland, Maier & Neustadt, P.C.

(57) ABSTRACT

It is an object of the present invention to allow efficient detection of computer viruses in a portable telephone. The server device 10 comprises a pattern data transmission request receiving unit 12 which receives pattern data transmission requests that include the model name of the portable telephone 100, a pattern data extraction unit 13 which extracts specified pattern data from a plurality of sets of pattern data on the basis of the model name of the portable telephone 100 contained in the pattern data transmission requests received by the pattern data transmission request receiving unit 12, and a pattern data transmitting unit 14 which transmits the specified pattern data extracted by the pattern data extraction unit 13 to the portable telephone 100.

45 Claims, 27 Drawing Sheets

FOREIGN PATENT DOCUMENTS

| | | |
|---|---|---|
| JP | 6-175887 | 6/1994 |
| JP | 2001-216233 | 8/2001 |
| JP | 2001-515625 A | 9/2001 |
| WO | WO 98/41919 | 9/1998 |
| WO | WO 01/33889 | 5/2001 |

* cited by examiner

Fig.3

| PATTERN DATA | MODEL |
|---|---|
| PATTERN DATA 1 | MODEL 1 |
| PATTERN DATA 2 | MODEL 2 |
| PATTERN DATA 3 | MODEL 1 |
| PATTERN DATA 4 | MODEL 2 |
| PATTERN DATA 5 | MODEL 1 |
| PATTERN DATA 6 | MODEL 2 |
| PATTERN DATA 7 | MODEL 1 |

| PATTERN DATA | DEGREE OF DANGER | SIZE |
|---|---|---|
| PATTERN DATA 1 | A | 15kB |
| PATTERN DATA 2 | B | 10kB |
| PATTERN DATA 3 | C | 20kB |
| PATTERN DATA 4 | C | 10kB |
| PATTERN DATA 5 | B | 20kB |
| PATTERN DATA 6 | A | 20kB |
| PATTERN DATA 7 | B | 20kB |

| TELEPHONE NUMBER | MODEL | OS |
|---|---|---|
| 090-0000-0000 | MODEL 1 | OS1, Ver1. 05 |
| 090-0000-0001 | MODEL 2 | OS1, Ver1. 05 |
| 090-0000-0002 | MODEL 1 | OS1, Ver1. 00 |

| PATTERN DATA | MODEL | OS | DEGREE OF DANGER | SIZE | DATE OF UPDATING |
|---|---|---|---|---|---|
| PATTERN DATA 1 | MODEL 1 | OS1, Ver1.05 | A | 15kB | 2001.11.2 |
| PATTERN DATA 2 | MODEL 2 | OS1, Ver1.05 | B | 10kB | 2001.11.5 |
| PATTERN DATA 3 | MODEL 1 | OS1, Ver1.05 | C | 20kB | 2001.11.7 |
| PATTERN DATA 4 | MODEL 2 | OS1, Ver1.05 | C | 10kB | 2001.11.8 |
| PATTERN DATA 5 | MODEL 1 | OS1, Ver1.00 | B | 20kB | 2001.11.9 |
| PATTERN DATA 6 | MODEL 2 | OS1, Ver1.00 | A | 20kB | 2001.11.9 |
| PATTERN DATA 7 | MODEL 1 | OS1, Ver1.05 | B | 20kB | 2001.11.9 |

| TELEPHONE NUMBER | APPLICATION PROGRAM |
|---|---|
| 090-0000-0000 | APPLICATION PROGRAM 1 |
|  | APPLICATION PROGRAM 2 |
| 090-0000-0001 | APPLICATION PROGRAM 1 |
|  | APPLICATION PROGRAM 5 |
|  | APPLICATION PROGRAM 6 |
| 090-0000-0002 | APPLICATION PROGRAM 4 |
|  | APPLICATION PROGRAM 7 |
|  | APPLICATION PROGRAM 9 |

| PATTERN DATA | APPLICATION PROGRAM |
|---|---|
| PATTERN DATA 1 | APPLICATION PROGRAM 1 |
| PATTERN DATA 2 | APPLICATION PROGRAM 3 |
| PATTERN DATA 3 | APPLICATION PROGRAM 1 |
| PATTERN DATA 4 | APPLICATION PROGRAM 3 |
| PATTERN DATA 5 | APPLICATION PROGRAM 1 |
| PATTERN DATA 6 | APPLICATION PROGRAM 2 |
| PATTERN DATA 7 | APPLICATION PROGRAM 3 |

| APPLICATION PROGRAM |
|---|
| APPLICATION PROGRAM 1 |
| APPLICATION PROGRAM 6 |
| APPLICATION PROGRAM 12 |

| PATTERN DATA | APPLICATION PROGRAM |
|---|---|
| PATTERN DATA 1 | APPLICATION PROGRAM 1 |
| PATTERN DATA 2 | APPLICATION PROGRAM 2 |
| PATTERN DATA 3 | APPLICATION PROGRAM 3 |
| PATTERN DATA 4 | APPLICATION PROGRAM 4 |

| TELEPHONE NUMBER | APPLICATION PROGRAM | PATTERN DATA |
|---|---|---|
| 090-0000-0000 | APPLICATION PROGRAM 1 | — |
|  | APPLICATION PROGRAM 2 | — |
| 090-0000-0001 | APPLICATION PROGRAM 1 | PATTERN DATA 1 |
|  | APPLICATION PROGRAM 5 | — |
|  | APPLICATION PROGRAM 8 | — |
| 090-0000-0002 | APPLICATION PROGRAM 4 | PATTERN DATA 4 |
|  | APPLICATION PROGRAM 7 | — |
|  | APPLICATION PROGRAM 9 | — |

| TELEPHONE NUMBER | COMMUNICATOR |
|---|---|
| 090-0000-0000 | 090-0000-0001 |
|  | 090-0000-0002 |
| 090-0000-0001 | 090-0000-0000 |
| 090-0000-0002 | 090-0000-0000 |
|  | 090-0000-0007 |
|  | 090-0000-0008 |

| PATTERN DATA | NUMBER OF DETECTIONS | THRESHOLD VALUE |
|---|---|---|
| PATTERN DATA 1 | 14800 | 15000 |
| PATTERN DATA 2 | 2436 | 2500 |
| PATTERN DATA 3 | 26056 | 30000 |

~71b

SERVER DEVICE, MOBILE COMMUNICATIONS TERMINAL, INFORMATION TRANSMITTING SYSTEM AND INFORMATION TRANSMITTING METHOD

BACKGROUND OF THE INVENTION

1. Field of the Invention

The present invention relates to a server device, a mobile communications terminal, an information transmitting system and an information transmitting method, and more particularly to a server device which transmits pattern data used for the detection of computer viruses to a mobile communications terminal, an information transmitting system, an information transmitting method, and a mobile communications terminal which receives pattern data transmitted from the server device.

2. Description of the Related Art

The current development of mobile communications technology has been remarkable, and our daily life activities are made increasingly convenient in the current age of the "information society". For example, as a result of the spread of the internet, useful application programs and data files can easily be downloaded into terminal devices such as personal computers or the like, and can be utilized.

However, items that are downloaded into terminal devices via the internet are not always limited to useful application programs and data. Specifically, computer viruses that destroy useful application programs and data also frequently invade terminal devices via the internet.

For example, computer virus detection techniques using pattern matching systems are known as techniques for detecting whether or not a computer virus has invaded a terminal device. In such techniques, a database accommodating characteristic data sequences (hereafter referred to as "pattern data") contained in computer viruses is transmitted to a terminal device from a server device and stored in the terminal device, and the abovementioned pattern data is compared with application programs and data that are similarly stored in the terminal device. As a result, in cases where application programs or data contain the abovementioned pattern data, it is judged that these application programs or data contain a computer virus. In cases where computer virus detection techniques using pattern matching systems are utilized, it is necessary that the abovementioned database be successively updated to the most recent version in order to increase the probability of detecting computer viruses. Accordingly, when a new type of computer virus is detected, characteristic pattern data contained in this computer virus is transmitted to the terminal device from the server device, and the abovementioned database of the terminal device is updated.

However, the following problems have been encountered in cases where the abovementioned conventional technique is used to detect computer viruses in a mobile communications terminal such as a portable telephone. Specifically, in the case of such a mobile communications terminal, the memory capacity and CPU capacity are insufficient compared to those of a terminal device such as a personal computer or the like. Accordingly, it is difficult to store all of the abovementioned database in a mobile communications terminal, and to compare all of the pattern data contained in this database with the application programs and data in the mobile communications terminal in a comprehensive manner. Furthermore, while terminal devices such as personal computers or the like and server devices are usual connected by a wire circuit, mobile communications terminals and server devices are connected by a wireless circuit. Accordingly, in cases where all of the abovementioned database is transmitted to a mobile communications terminal from a server device, a very large wireless resource is consumed. For such reasons, the detection of computer viruses in mobile communications terminals cannot be efficient performed in the case of the abovementioned conventional technique.

SUMMARY OF THE INVENTION

Accordingly, it is an object of the present invention to provide a server device, an information transmitting system and an information transmitting method which solve the abovementioned problems and make it possible to accomplish the detection of computer viruses in a mobile communications terminal in an efficient manner.

In order to solve the abovementioned problems, the server device of the present invention is a server device which transmits pattern data used for the detection of computer viruses to a mobile communications terminal, comprising extraction means for extracting specified pattern data from a plurality of sets of pattern data on the basis of terminal information relating to the abovementioned mobile communications terminal, and transmitting means for transmitting the abovementioned specified pattern data extracted by the abovementioned extraction means to the abovementioned mobile communications terminal.

Furthermore, in order to solve the abovementioned problems, the information transmitting system of the present invention comprises a mobile communications terminal and the abovementioned server device that transmits pattern data used for the detection of computer viruses to the abovementioned mobile communications terminal.

Furthermore, in order to solve the abovementioned problems, the information transmitting method of the present invention is an information transmitting method in which pattern data used for the detection of computer viruses is transmitted from a server device to a mobile communications terminal, comprising an extraction step in which the abovementioned server device extracts specified pattern data from a plurality of sets of pattern data on the basis of terminal information relating to the abovementioned mobile communications terminal, and a transmission step in which the abovementioned server device transmits the abovementioned specified pattern data extracted in the abovementioned extraction step to the abovementioned mobile communications terminal.

There are many computer viruses that depend on the conditions of the mobile communications terminal, such as the hardware and software of the mobile communications terminal, the data received by the mobile communications terminal (including application programs), and the like. Furthermore, the quantity of pattern data that can be received, the quantity of pattern data that can be stored and the quantity of pattern data that can be compared vary depending on the conditions of the mobile communications terminal such as the hardware and software of the mobile communications terminal. By extracting specified pattern data on the basis of terminal information such as the hardware or software of the mobile communications terminal, the history of data reception in the mobile communications terminal or the like, and transmitting the specified data that is thus extracted to the mobile communications terminal, it is possible to achieve an efficient reduction in the quantity of pattern data that is transmitted to the mobile communications terminal from the server device, the quantity of pattern data that is stored in the mobile communications terminal, and the quantity of pattern data that is compared by the mobile communications terminal, in accordance with the conditions of this mobile communications terminal.

Furthermore, in the server device of the present invention, it is desirable that the abovementioned terminal information be information that relates to the hardware of the abovementioned mobile communications terminal.

Furthermore, in the information transmitting method of the present invention, it is desirable that the abovementioned terminal information be information that relates to the hardware of the abovementioned mobile communications terminal.

Computer viruses include many viruses that depend on the hardware of mobile communications terminals. Furthermore, the quantity of pattern data that can be received, the quantity of pattern data that can be stored and the quantity of pattern data that can be compared vary according to the hardware of the mobile communications terminal in question. By extracting specified pattern data on the basis of information relating to the hardware of the mobile communications terminal, and transmitting the specified pattern data that is thus extracted to the mobile communications terminal, it is possible to achieve an efficient reduction in the quantity of pattern data that is transmitted to the mobile communications terminal from the server device, the quantity of pattern data that is stored in the mobile communications terminal, and the quantity of pattern data that is compared by the mobile communications terminal, in accordance with the hardware of this mobile communications terminal.

Furthermore, in the server device of the present invention, it is desirable that the abovementioned terminal information be information that relates to the memory capacity of the abovementioned mobile communications terminal.

Furthermore, in the information transmitting method of the present invention, it is desirable that the abovementioned terminal information be information that relates to the memory capacity of the abovementioned mobile communications terminal.

The quantity of pattern data that can be stored in the mobile communications terminal depends on the memory capacity of the mobile communications terminal. By extracting specified pattern data on the basis of information relating to the memory capacity of the mobile communications terminal, and transmitting the specified pattern data that is thus extracted to the mobile communications terminal, it is possible to achieve an efficient reduction in the quantity of pattern data that is transmitted to the mobile communications terminal from the server device, the quantity of pattern data that is stored in the mobile communications terminal, and the quantity of pattern data that is compared by the mobile communications terminal, in accordance with the memory capacity of this mobile communications terminal.

Furthermore, in the server device of the present invention, it is desirable that the abovementioned terminal information be information that relates to the software of the abovementioned mobile communications terminal.

Furthermore, in the information transmitting method of the present invention, it is desirable that the abovementioned terminal information be information that relates to the software of the abovementioned mobile communications terminal.

Computer viruses include many viruses that depend on the software of mobile communications terminals. Furthermore, the quantity of pattern data that can be received, the quantity of pattern data that can be stored and the quantity of pattern data that can be compared vary according to the software of the mobile communications terminal in question. By extracting specified pattern data on the basis of information relating to the software of the mobile communications terminal, and transmitting the specified pattern data that is thus extracted to the mobile communications terminal, it is possible to achieve an efficient reduction in the quantity of pattern data that is transmitted to the mobile communications terminal from the server device, the quantity of pattern data that is stored in the mobile communications terminal, and the quantity of pattern data that is compared by the mobile communications terminal, in accordance with the software of this mobile communications terminal.

Furthermore, in the server device of the present invention, it is desirable that the abovementioned terminal information be information that relates to the operating system of the abovementioned mobile communications terminal.

Furthermore, in the information transmitting method of the present invention, it is desirable that the abovementioned terminal information be information that relates to the operating system of the abovementioned mobile communications terminal.

Computer viruses include many viruses that depend on the operating systems of mobile communications terminals. Furthermore, the quantity of pattern data that can be received, the quantity of pattern data that can be stored and the quantity of pattern data that can be compared vary according to the operating system of the mobile communications terminal in question. By extracting specified pattern data on the basis of information relating to the operating system of the mobile communications terminal, and transmitting the specified pattern data that is thus extracted to the mobile communications terminal, it is possible to achieve an efficient reduction in the quantity of pattern data that is transmitted to the mobile communications terminal from the server device, the quantity of pattern data that is stored in the mobile communications terminal, and the quantity of pattern data that is compared by the mobile communications terminal, in accordance with the operating system of this mobile communications terminal.

Furthermore, in the server device of the present invention, it is desirable that the abovementioned terminal information be information that relates to the application programs that are stored in the abovementioned mobile communications terminal.

Furthermore, in the information transmitting method of the present invention, it is desirable that the abovementioned terminal information be information that relates to the application programs that are stored in the abovementioned mobile communications terminal.

Furthermore, in the server device of the present invention, it is desirable that the abovementioned terminal information be information that relates to the history of data reception in the abovementioned mobile communications terminal.

Furthermore, in the information transmitting method of the present invention, it is desirable that the abovementioned terminal information be information that relates to the history of data reception in the abovementioned mobile communications terminal.

Computer viruses include many viruses that depend on the data (including application software) received by mobile communications terminals. By extracting specified pattern data on the basis of information relating to the history of data reception in the mobile communications terminal, and transmitting the specified pattern data that is thus extracted to the mobile communications terminal, it is possible to achieve an efficient reduction in the quantity of pattern data that is transmitted to the mobile communications terminal from the server device, the quantity of pattern data that is stored in the mobile communications terminal, and the quantity of pattern data that is compared by the mobile communications terminal, in accordance with the data received by this mobile communications terminal.

Furthermore, in the server device of the present invention, it is desirable that the abovementioned transmitting means transmit a list of the abovementioned specified pattern data extracted by the abovementioned extraction means to the abovementioned mobile communications terminal, and transmit pattern data selected by the user of the abovementioned mobile communications terminal from the abovementioned specified pattern data to the abovementioned mobile communications terminal.

Furthermore, in the information transmitting method of the present invention, it is desirable that the abovementioned transmission step be a step in which the abovementioned server device transmits a list of the abovementioned specified pattern data extracted in the abovementioned extraction step to the abovementioned mobile communications terminal, and in which the abovementioned server device transmits pattern data selected by the user of the abovementioned mobile communications terminal from the abovementioned specified pattern data to the abovementioned mobile communications terminal.

By transmitting a list of the specified pattern data that is extracted to the mobile communications terminal, and transmitting pattern data selected by the user of the mobile communications terminal from this specified pattern data to the mobile communications terminal, it is possible to achieve a further reduction in the quantity of pattern data that is transmitted to the mobile communications terminal from the server device, the quantity of pattern data that is stored in the mobile communications terminal, and the quantity of pattern data that is compared by the mobile communications terminal.

Furthermore, in the server device of the present invention, it is desirable that the server device further comprise detection means for detecting whether or not a computer virus is contained in the data present in this server device using the specified pattern data extracted by the abovementioned extraction means.

Furthermore, in the information transmitting method of the present invention, it is desirable that the method further comprise a detection step in which the abovementioned server device detects whether or not a computer virus is contained in the data that is present in this server device among the data relating to the specified pattern data that is extracted in the abovementioned extraction step.

If it is detected whether or not a computer virus is contained in the server device, it is not always absolutely necessary to transmit pattern data to the mobile communications terminal, store pattern data in the mobile communications terminal, or compare the pattern data in the mobile communications terminal. Accordingly, the quantity of pattern data that is transmitted from the server to the mobile communications terminal, the quantity of pattern data that is stored in the mobile communications terminal and the quantity of pattern data that is compared by the mobile communications terminal can be further reduced.

Furthermore, in the server device of the present invention, it is desirable that the server device further comprise first storing means for storing information that relates to the history of data reception in each of a plurality of mobile communications terminals, and first warning transmitting means for transmitting a warning to other mobile communications terminal that have received specified data on the basis of information relating to the abovementioned reception history stored in the abovementioned first storing means in cases where it is confirmed that a computer virus is contained in the abovementioned specified data.

Furthermore, in the information transmitting method of the present invention, it is desirable that the method further comprise a first warning transmission step in which information relating to the history of data reception in each of a plurality of mobile communications terminals is stored in storing means, and the abovementioned server device transmits a warning to other mobile communications terminal that have received specified data on the basis of information relating to the abovementioned reception history stored in the abovementioned storing means in cases where it is confirmed that a computer virus is contained in the abovementioned specified data.

In cases where it is confirmed that a computer virus is contained in specified data (including application programs) in a certain mobile communications terminal, it is highly possible that this computer virus is also present in other mobile communications terminal that have received this specified data. By transmitting a warning to other mobile communications terminals that have received the abovementioned specified data on the basis of information relating to the history of data reception, it is possible to send a warning to other mobile communications terminal in which it is highly possible that the computer virus is present.

Furthermore, in the server device of the present invention, it is desirable that the server device further comprise second storing means for storing information that relates to the history of communications among a plurality of mobile communications terminals, and second warning transmitting means for transmitting warnings to other mobile communications terminals that have communicated with a specified mobile communications terminal on the basis of information relating to the communications history stored in said second storing means in cases where it is confirmed that a computer virus is contained in specified data stored in said specified mobile communications terminal.

Furthermore, in the information transmitting method of the present invention, it is desirable that the method further comprise a second warning transmission step in which information relating to the history of communications among a plurality of mobile communications terminals is stored in storing means, and the abovementioned server device transmits a warning to other mobile communications terminals that have communicated with a specified mobile communications terminal on the basis of information relating to the communications history stored in the abovementioned storing means in cases where it is confirmed that a computer virus is contained in specified data stored in the abovementioned specified mobile communications terminal.

In cases where it is confirmed that a computer virus is contained in specified data (including application programs) in a certain mobile communications terminal, it is possible that this computer virus is also present in other mobile communications terminals that have communicated with this mobile communications terminal. By transmitting warnings to other mobile communications terminals that have communicated with the abovementioned mobile communications terminal on the basis of information relating to the history of communications among a plurality of mobile communications terminals, it is possible to send a warning to other mobile communications terminals in which it is possible that the computer virus is present.

Furthermore, in the server device of the present invention, it is desirable that the server device further comprise receiving means for receiving computer virus detection information indicating that a computer virus has been detected from the abovementioned mobile communications terminal, and third warning transmitting means for a warning to mobile communications terminals that are the object of warning transmission in cases where the number of times that computer virus detection information is received by the abovementioned receiving means is equal to or greater than a predetermined fixed number.

Furthermore, in the information transmitting method of the present invention, it is desirable that the method further comprise a receiving step in which the abovementioned server device receives computer virus detection information indicating that a computer virus has been detected from the abovementioned mobile communications terminal, and a third warning transmitting step in which the abovementioned server device transmits a warning to mobile communications terminals that are the object of warning transmission in cases where the number of times that computer virus detection information is received in the abovementioned receiving step is equal to or greater than a predetermined fixed number.

By receiving computer virus detection information from the mobile communications terminal and transmitting a warning to mobile communications terminal that are the object of warning transmission in cases where the number of times that computer virus detection information is received is equal to or greater than a predetermined fixed number, it is possible to send a warning to mobile communications terminals regarding widely spread computer viruses.

Furthermore, the mobile communications terminal of the present invention is a mobile communications terminal which receives pattern data used for computer virus detection that is transmitted from a server device, comprising transmitting means for transmitting terminal information relating to the abovementioned mobile communications terminal to the abovementioned server device, receiving means for receiving the abovementioned pattern data that is extracted in the abovementioned server device and transmitted on the basis of the abovementioned terminal information transmitted by the abovementioned transmitting means, and storing means for storing the abovementioned pattern data that is received by the above mentioned receiving means.

By transmitting terminal information relating to the mobile communications terminal from the abovementioned mobile communications terminal to the server device, it is possible to extract specified pattern data on the basis of the abovementioned terminal information in the server device, and to transmit the specified pattern data that is thus extracted to the mobile communications terminal. By receiving and storing that specified pattern data that is thus extracted and transmitted, it is possible to achieve an efficient reduction in the quantity of pattern data that is transmitted from the server device to the mobile communications terminal, the quantity of pattern data that is stored in the mobile communications terminal, and the quantity of pattern data that is compared by the mobile communications terminal, in accordance with the conditions of the abovementioned mobile communications terminal.

BRIEF DESCRIPTION OF THE DRAWINGS

FIG. 3 is a structural diagram of the pattern data database;

FIG. 5 is a structural diagram of the pattern data database;

FIG. 8 is a structural diagram of the terminal information database;

FIG. 9 is a structural diagram of the pattern data database;

FIG. 14 is a structural diagram of the downloading history database;

FIG. 15 is a structural diagram of the pattern data database;

FIG. 18 is a structural diagram of the application database;

FIG. 19 is a structural diagram of the pattern data database;

FIG. 24 is a structural diagram of the downloading history database;

FIG. 25 is a structural diagram of the communications history database;

FIG. 28 is a structural diagram of the detection information database;

DESCRIPTION OF THE PREFERRED EMBODIMENTS

First Embodiment

An information transmitting system constituting a first embodiment of the present invention will be described. Furthermore, the information transmitting system of the present embodiment includes a server device and a mobile communications terminal that constitute embodiments of the present invention.

Figure 1:
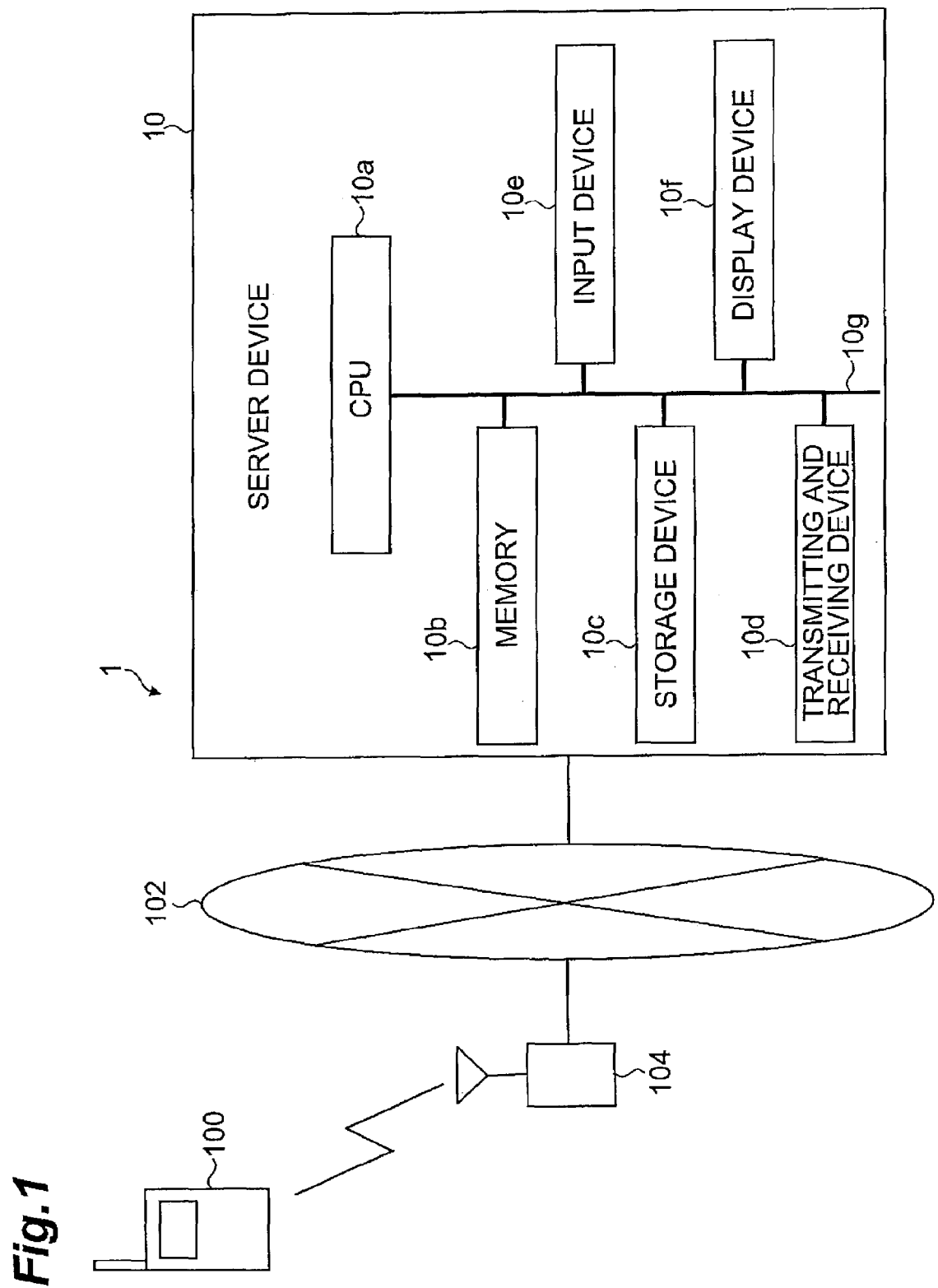
FIG. 1 is a hardware structural diagram of the information transmitting system of the first embodiment.

First, the construction of the information transmitting system of the present embodiment will be described. FIG. 1 is a hardware structural diagram of the information transmitting system of the present embodiment. The information transmitting system 1 of the present embodiment comprises a server device 10 and a portable telephone 100 (mobile communications terminal). Here, the server device 10 and portable telephone 100 are connected via a mobile communications network 102 and base station 104, so that mutual data communications are possible.

The server device 10 comprises a CPU 10a, a memory 10b, a storage device 10c such as a magnetic disk, optical disk or the like, a transmitting and receiving device 10d which performs the transmission and reception of data between the server device 10 and the portable telephone 100, an input device 10e such as a keyboard, mouse or the like, and a display device 10f such as a display or the like. Here, the CPU 10a, memory 10b, storage device 10c, transmitting and receiving device 10d, input device 10e and display device 10f are respectively connected by a bus 10g, so that the mutual transmission and reception of data are possible.

Figure 30:
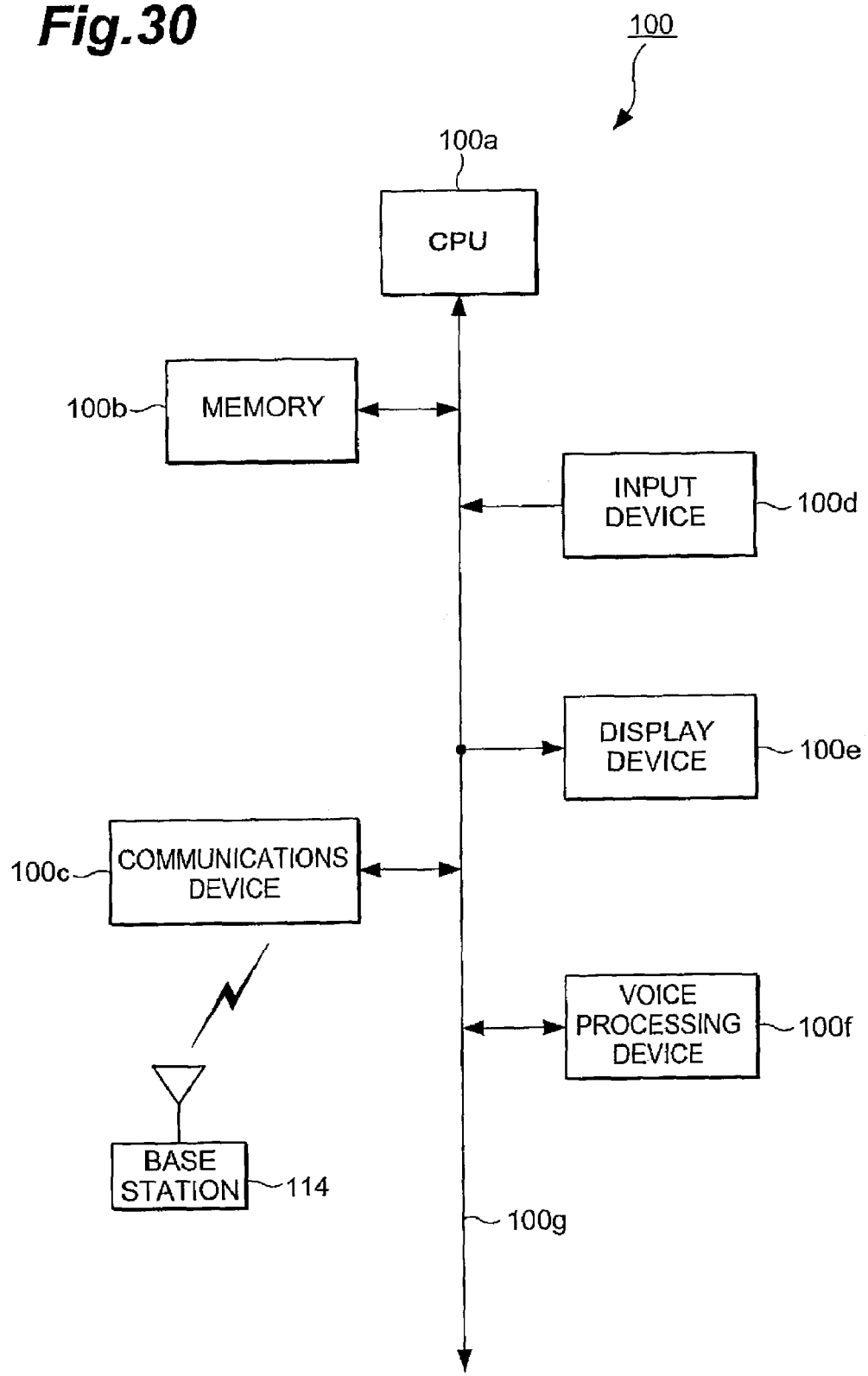
FIG. 30 is a hardware structural diagram of the portable telephone of the first embodiment.

FIG. 30 is a hardware structural diagram of the portable telephone 100. The portable telephone 100 comprises a CPU 100a, a memory 100b such as a semiconductor memory or the like, a communications device 100c which performs the transmission and reception of data between the portable telephone 100 and server device 10, an input device 100d such as operating buttons or the like, a display device 100e such as an LCD (liquid crystal display), EL (electro-luminescence) [device] or the like, and a voice processing device 100f consisting of a microphone and speaker or the like. Here, the CPU 100a, memory 100b, communications device 100c, input device 100d, display device 100e and voice processing device 100f are respectively connected by a bus 100g, so that mutual data transmission and reception are possible.

Figure 2:
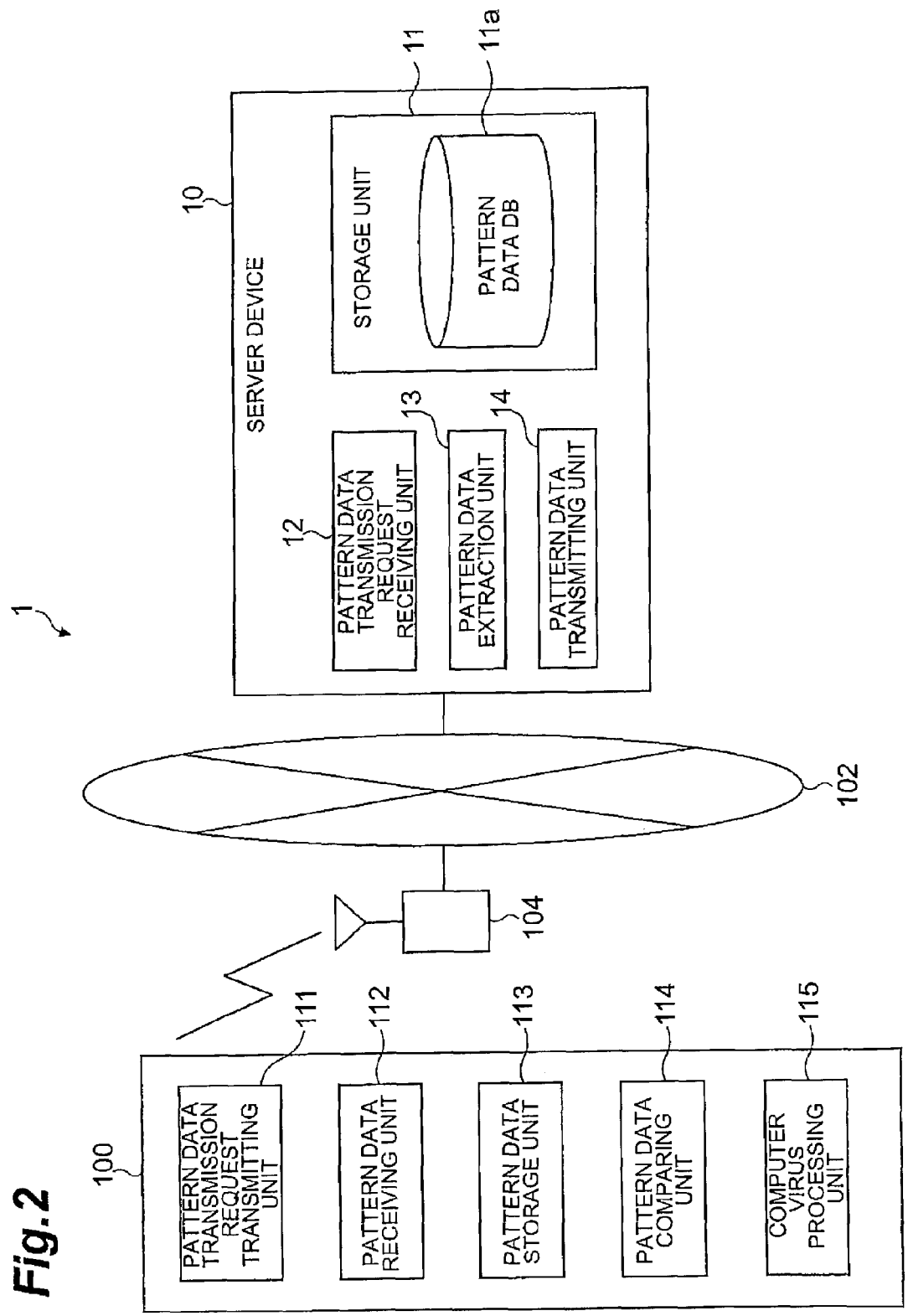
FIG. 2 is a system structural diagram of the information transmitting system of the first embodiment.

FIG. 2 is a system structural diagram of the information transmitting system 1. The server device 10 of the information transmitting system 1 is a server device which transmits pattern data used for the detection of computer viruses to the portable telephone 100; in functional terms, this server device 10 comprises a storage unit 11, a pattern data transmission request receiving unit 12, a pattern data extraction unit 13 (extraction means) and a pattern data transmitting unit 14 (transmitting means) Here, the storage unit 11 corresponds to the storage device 10c shown in FIG. 1. Furthermore, the pattern data transmission request receiving unit 12, the pattern data extraction unit 13 and the pattern data transmitting unit 14 are realized as a result of software stored in the storage device 10c shown in FIG. 1 being executed by the CPU 10a. These respective constituent elements will be described in detail below.

A pattern data database 11a is stored in the storage unit 11. FIG. 3 is a structural diagram of the pattern data database. Pattern data consisting of characteristic data sequences contained in computer viruses (these data sequences may be converted into files and referred to as "pattern files"), and model names of portable telephones to which this pattern data is to be transmitted, are stored in association with each other in the pattern data database 11a. Furthermore, for convenience of description, the pattern data itself is described as being stored information transmitting system he pattern data database 11a; however, it would also be possible to store pointers that indicate the storage locations of the pattern data in the pattern data database, and to store the pattern data itself in the storage locations indicated by these pointers.

Returning to FIG. 2, the pattern data transmission request receiving unit 12 receives pattern data transmission requests that are transmitted from the portable telephone 100. The model name of the portable telephone 100 is contained in these pattern data transmission requests.

The pattern data extraction unit 13 extracts specified pattern data from a plurality of sets of pattern data on the basis of the model name (terminal information) of the portable telephone 100 contained in the pattern data transmission requests received by the pattern data transmission request receiving unit 12. To describe this in greater detail, the pattern data extraction unit 13 extracts specified pattern data that is to be transmitted to the portable telephone 100 from the pattern data stored in the pattern data database 11a of the storage unit 11 using the model name of the portable telephone 100 as a key.

The pattern data transmitting unit 14 transmits the specified pattern data extracted by the pattern data extraction unit 13 to the portable telephone 100.

The portable telephone 100 of the information transmitting system 1 is a portable telephone which receives pattern data used for the detection of computer viruses that is transmitted from the server device 10; in functional terms, this portable telephone 100 comprises a pattern data transmission request transmitting unit 111 (transmitting means), a pattern data receiving unit 112 (receiving means), a pattern data storage unit 113 (storing means), a pattern data comparing unit 114 and a computer virus processing unit 107. Here, the pattern data storage unit 113 corresponds to the memory 100b shown in FIG. 30. The pattern data transmission request transmitting unit 111, pattern data receiving unit 112, pattern data comparing unit 114 and computer virus processing unit 115 are realized as a result of software stored in the memory 110b shown in FIG. 30 being executed by the CPU 110a. These respective constituent elements will be described in detail below.

The pattern data transmission request transmitting unit 111 transmits pattern data transmission requests to the server device 10. The model name (terminal information) of the portable telephone 100 is contained in these pattern data transmission requests.

The pattern data receiving unit 112 receives the pattern data that is transmitted from the server device 10. To describe this in greater detail, the pattern data receiving unit 112 receives the pattern data that is extracted in the abovementioned server device 10 and transmitted on the basis of the model name transmitted by the pattern data transmitting unit 111.

The pattern data storage unit 113 stores the pattern data that is received by the pattern data receiving unit 112.

The pattern data comparing unit 114 uses the pattern data stored in the pattern data storage unit 105 to detect whether or not a computer virus is contained in the data (including application programs) present in the portable telephone 100. To describe this in greater detail, the pattern data comparing unit 114 compares the pattern data stored in the pattern data storage unit 113 with the data that is present in the portable telephone 100, and judges whether are not there are portions of the data present in the portable telephone 100 that match the abovementioned pattern data. Here, in cases where this data present in the portable telephone 100 has portions that match the abovementioned pattern data, the pattern data comparing unit 114 judges that a computer virus is contained in the data present in the portable telephone 100, and in cases where the data present in the portable telephone 100 does not have portions that match the abovementioned pattern data, the pattern data comparing unit 114 judges that no computer virus is contained in the data present in the portable telephone 100.

In cases where it is judged by the pattern data comparing unit 114 that a computer virus is contained in the specified data, the computer virus processing unit 115 performs processing that sends a warning to the user of the portable telephone 100, processing the prohibits the execution of the application program in question, processing that repairs the data in question or the like, on the basis of predetermined set information.

Figure 4:
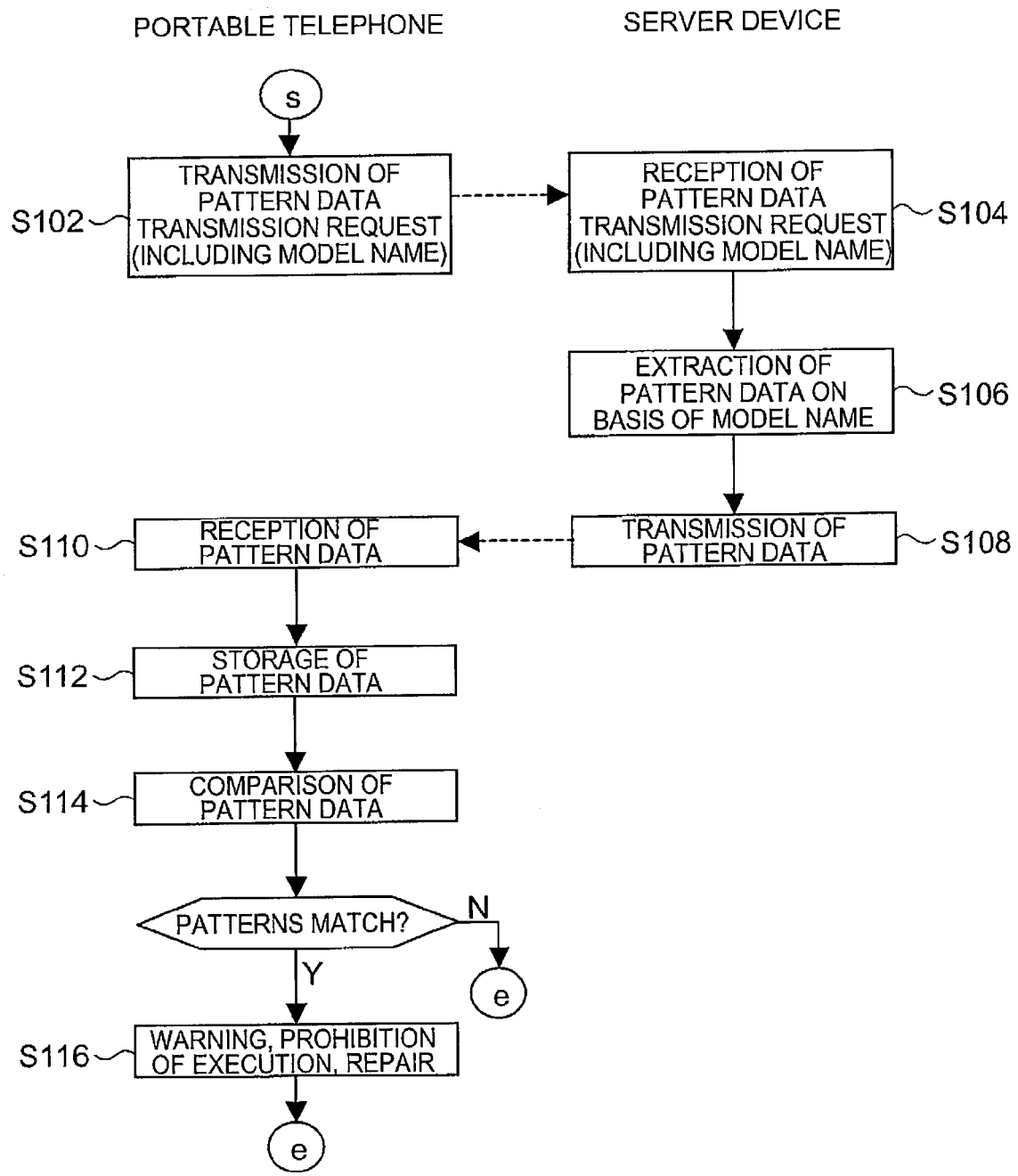
FIG. 4 is a flow chart which shows the flow of the processing of the information transmitting system of the first embodiment.

Next, the operation of the information transmitting system of the present embodiment will be described, and an information transmitting method constituting an embodiment of the present invention will also be described. FIG. 4 is a flow chart which illustrates the operation of the information transmitting system of the present embodiment. In the information transmitting system 1 of the present embodiment, when pattern data used for the detection of computer viruses is sent to the portable telephone 100 from the server device 10, a pattern data transmission request is first transmitted from the pattern data request transmitting unit 111 of the portable telephone 100 to the server device 10 (S102). Here, the model name of the portable telephone 100 is contained in this pattern data transmission request. Furthermore, the system may be devised so that such a pattern data transmission request is transmitted when there is an instruction for such transmission from the user of the portable telephone 100, or so that such a pattern data transmission request is periodically transmitted on the basis of a predetermined period. The pattern data transmission request transmitted from the portable telephone 100 is received by the pattern data transmission request receiving unit 12 of the server device 10 (s104).

When a pattern data transmission request is received by the pattern data transmission request receiving unit 12 of the server device 10, specified data is extracted from a plurality of sets of pattern data by the pattern data extraction unit 13 on the basis of the model name of the portable telephone 100 that is contained information transmitting system he pattern data transmission request (s106). To describe this in greater detail, specified pattern data that is to be transmitted to the portable telephone 100 is extracted from the pattern data stored in the pattern data database 11a of the storage unit 11 using the model name of the portable telephone 100 as a key. For example, in a case where the model name of the portable telephone 100 is "Model 2", "pattern data 2", "pattern data 4" or "pattern data 6" is extracted from the pattern data database 11a shown in FIG. 3 as the pattern data that is to be transmitted to the portable telephone 100.

The pattern data that is extracted by the pattern data extraction unit 13 is transmitted to the portable telephone 100 from the pattern data transmitting unit 14 (S108), and is received by the pattern data receiving unit 112 of the portable telephone 100 (S110). The pattern data received by the portable telephone 100 is temporarily stored in the pattern data storage unit 113 of the portable telephone 100 (S112).

Subsequently, the pattern data stored in the pattern data storage unit 102 of the portable telephone 100 and the data (including application programs) stored in the portable telephone 100 are compared by the pattern data comparing unit 103 (S114), and a judgement is made as to whether or not the data stored in the memory of the portable telephone 100 has a portion that matches the abovementioned pattern data. Furthermore, the comparison of the data stored in the portable telephone 100 and the pattern data may be initiated at the time that the pattern data is received (or after a fixed period of time has elapsed following the reception of this pattern data); alternatively, this comparison may be initiated by instructions from the user of the portable telephone 100, or may be periodically initiated on the basis of a predetermined period.

In cases where the results of the abovementioned comparison indicate that no portion matching the abovementioned pattern data is contained in the data stored in the portable telephone 100, it is judged that no computer virus is present in the portable telephone 100, and the processing is ended. On the other hand, in cases where a portion that matches the abovementioned pattern data is contained in the data stored in the memory of the portable telephone 100, it is judged that a computer virus is present in the portable telephone 100, and the processing of a warning to the user of the portable telephone 100, processing that prohibits the execution of the application program in which the computer virus has been detected, processing that repairs the data in which the computer virus has been detected or the like is executed on the basis of predetermined set information by the computer virus processing unit 115 (S116). Furthermore, the, abovementioned warning processing, execution prohibition processing and repair processing are respectively similar to existing warning processing, execution prohibition processing and repair processing that are performed in cases where computer viruses are detected in personal computers.

Next, the effects and merits of the information transmitting system of the present embodiment will be described. Computer viruses include many viruses that depend on the hardware or software of portable telephones. Furthermore, the quantity of pattern data that can be received, the quantity of pattern data that can be stored and the quantity of pattern data that can be compared vary according to the hardware and software of the portable telephone in question. In this regard, the information transmitting system 1 of the present embodiment is devised so that when pattern data used for the detection of computer viruses is transmitted to the portable telephone 100 from the server device 10, specified pattern data is extracted on the basis of the model name of the portable telephone 100 (information that specifies both the hardware and software), and this specified pattern data that is extracted is transmitted to the portable telephone 100. Accordingly, the quantity of pattern data that is transmitted from the server device 10 to the portable telephone 100, the quantity of pattern data that is stored in the portable telephone 100 and the quantity of pattern data that is compared by the portable telephone 100 can be efficiently reduced in accordance with the hardware and software of the portable telephone 100. As a result, the detection of computer viruses in the portable telephone 100 can be performed in an efficient manner.

In the information transmitting system 1 of the abovementioned embodiment, the portable telephone 100 sends a pattern data transmission request that includes the model name of the portable telephone 100 to the server device 10, and the server device 10 extracts pattern data on the basis of this model name. However, various modifications of this embodiment are conceivable. For example, the system may be devised so that the portable telephone 100 transmits a pattern data transmission request that includes the name of the maker of the portable telephone 100 to the server device 10, and the server device 10 extracts pattern data on the basis of this maker's name. Furthermore, instead of the model name or the name of the maker of the portable telephone 100, it would also be possible to use the memory capacity of the portable telephone 100, the name of the operating system, the security level, the permissible communications charge or the like. Moreover, in the pattern data database 11a, it would also be possible to extract and arrange the pattern data that is to be transmitted to the portable telephone according to respective model names beforehand.

As one example, a modification in which a pattern data transmission request that includes the memory capacity of the portable telephone 100 is sent to the server device 10 by the portable telephone 100, and the server device 10 extracts pattern data on the basis of this memory capacity, will be described in detail below.

In the present modification, a pattern data database 11b of the type shown in FIG. 5 is used instead of the pattern data database 11a shown in FIG. 3. Pattern data, the degree of danger of computer viruses having this pattern data and the size of this pattern data are stored in association with each other in the pattern data database 11b. Here, the "degree of danger" of a computer virus is an indicator that indicates the virulence of the [deleterious] effect of the computer virus in question; for example, a degree of danger of "A" indicates that the [deleterious] effect of the computer virus is extremely great, a degree of danger of "B" indicates that the [deleterious] effect is considerable, and a degree of danger of "C" indicates that the [deleterious] effect is small.

Figure 6:
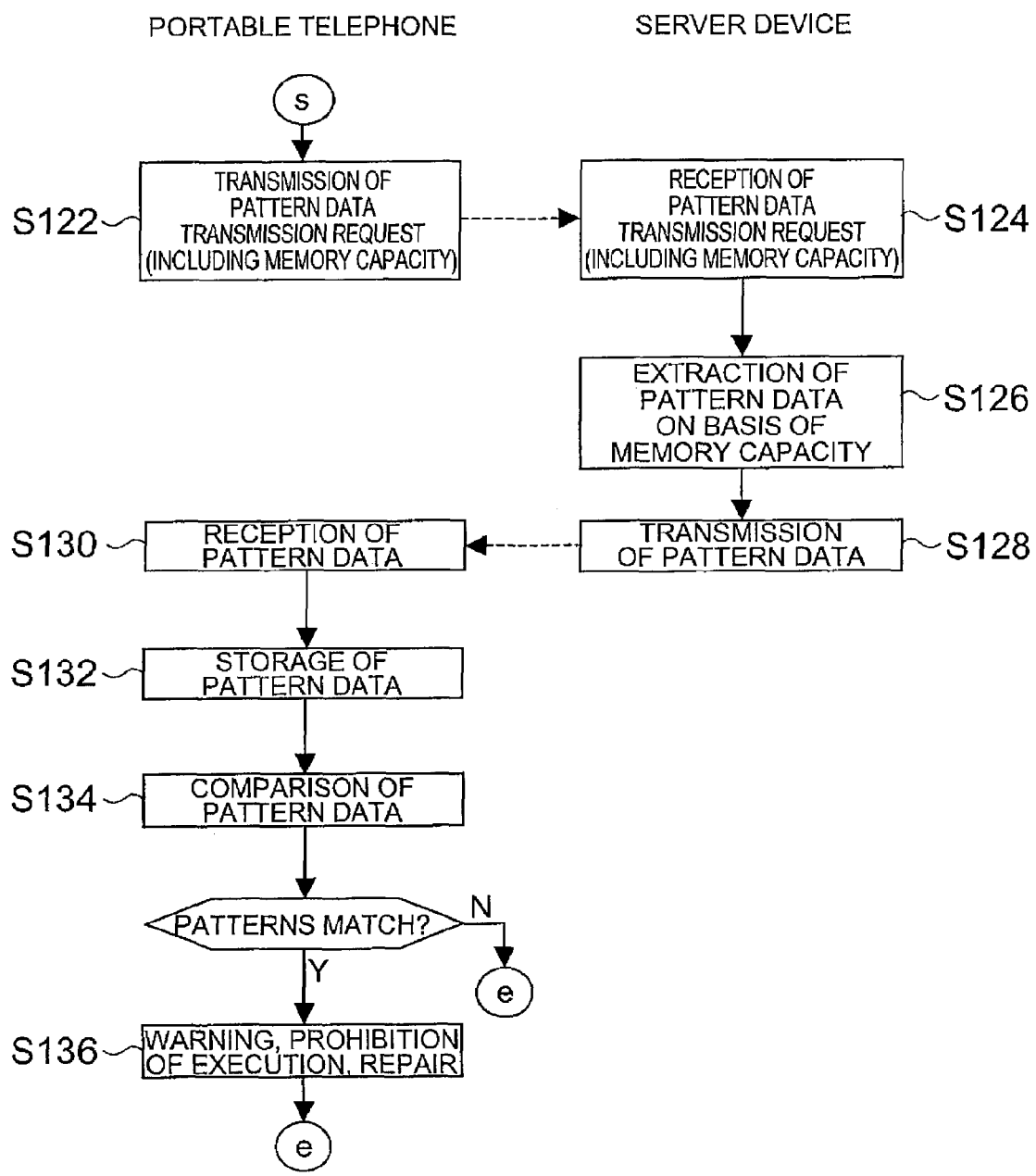
FIG. 6 is a flow chart which shows the flow of the processing of the information transmitting system in a modification of the first embodiment.

FIG. 6 is a flow chart which shows the flow of the processing of the information transmitting system of the present modification. In the information transmitting system 1 of the present modification, when pattern data used for the detection of computer viruses is transmitted from the server device 10 to the portable telephone 100, a pattern data transmission request is first transmitted to the server device 10 from the pattern data transmission request transmitting unit 111 of the portable telephone 100 (S122) Here, the memory capacity of the portable telephone 100 is included in the pattern data transmission request. Here, furthermore, the "memory capacity" may be the capacity of the entire memory region, or may be the capacity of the empty region; alternatively, this memory capacity may be the capacity of a region that is assigned beforehand for the purpose of storing pattern data. Furthermore, the term "memory" used here includes not only the internal memory of the portable telephone 100, but also memories that may be connected to the portable telephone 100. The pattern data transmission request that is transmitted from the portable telephone 100 is received by the pattern data transmission request receiving unit 12 of the server device 10 (S104).

When a pattern data transmission request is received by the pattern data transmission request receiving unit 12 of the server device 10, specified pattern data is extracted from a plurality of sets of pattern data by the pattern data extraction unit 13 on the basis of the memory capacity of the portable telephone 100 that is included in the abovementioned pattern data transmission request (S126) To describe this in greater detail, specified pattern data that is to be transmitted to the portable telephone 100 is extracted from the pattern data stored in the pattern data database 111b of the storage unit 11 in order from the highest degree of danger that does not exceed the range of the abovementioned memory capacity. For example, in a case where the memory capacity of the portable telephone 100 is "40 kB", "pattern data 1" (degree of danger A, 15 kB) and "pattern data 6" (degree of danger A, 20 kB) are extracted information transmitting system he pattern data database 11b shown in FIG. 5. Subsequently, the processing of S128 through S136 is the same as the processing of S108 through S116 described with reference to FIG. 4.

The quantity of pattern data that can be stored in the portable telephone 100 depends on the memory capacity of the portable telephone 100. By extracting pattern data on the basis of the memory capacity of the portable telephone 100 and transmitting the extracted pattern data to the portable telephone 100 as in the present modification, it is possible to achieve an efficient reduction in the quantity of pattern data that is transmitted from the server device 10 to the portable telephone 100, the quantity of pattern data that is stored in the portable telephone 100, and the quantity of pattern data that is compared by the portable telephone 100, in accordance with the memory capacity of this portable telephone 100.

Second Embodiment

Next, an information transmitting system constituting a second embodiment of the present invention will be described. Furthermore, the information transmitting system of the present embodiment includes a server device which constitutes an embodiment of the present invention.

First, the construction of the information transmitting system of the present embodiment will be described. The hardware construction of the information transmitting system of the present embodiment is similar to the hardware construction of the information transmitting system 1 of the above first embodiment described with reference to FIGS. 1 and 30.

Figure 7:
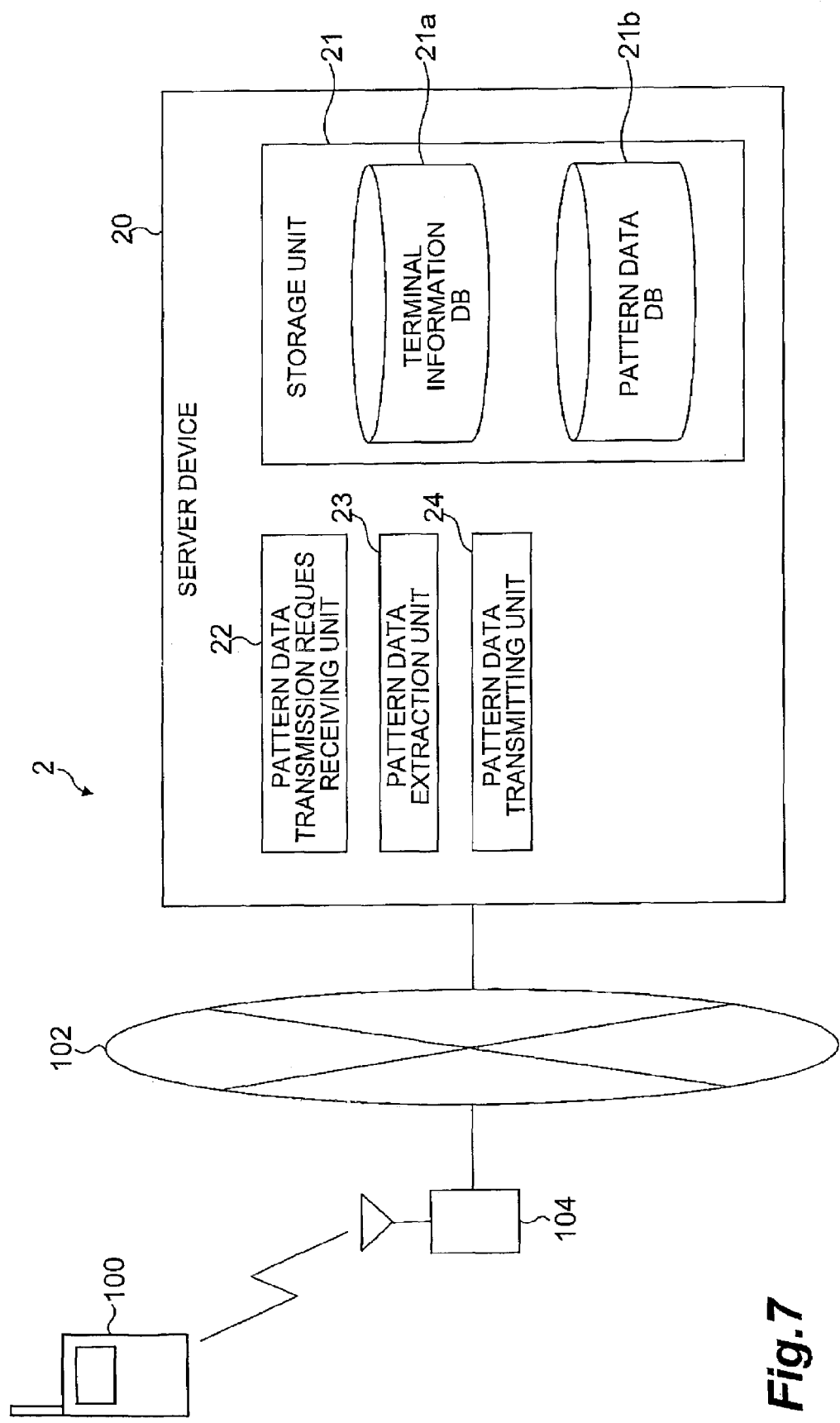
FIG. 7 is a system structural diagram of the information transmitting system of the second embodiment.

FIG. 7 is a system structural diagram of the information transmitting system 2 of the present embodiment. The server device 20 of the information transmitting system 2 is a server device which transmits pattern data used for the detection of computer viruses to a portable telephone 100. In functional terms, this server device 20 comprises a storage unit 21, a pattern data transmission request receiving unit 22, a pattern data extraction unit 23 (extraction means) and a pattern data transmitting unit 24 (transmitting means). Here, the storage unit 21 corresponds to the storage device 10c shown in FIG. 1. Furthermore, the pattern data transmission request receiving unit 22, pattern data extraction unit 23 and pattern data transmitting unit 24 are realized as a result of software stored in the storage device 10c shown in FIG. 1 being executed by the CPU 10a. The respective constituent elements will be described in detail below.

A terminal information database 21a and a pattern data database 21b are stored in the storage unit 21. FIG. 8 is a structural diagram of the terminal information database 21a. The telephone numbers of portable telephones, model names of these portable telephones and names of the operating systems (including version names) of these portable telephones are stored in the terminal information database 21a in association with each other. FIG. 9 is a structural diagram of the pattern data database 21b. Pattern data, model names and operating system names (including version names) of the portable telephones to which the pattern data is to be transmitted, the degree of danger of computer viruses having this pattern data, the size of this pattern data and the dates of updating of this pattern data are stored in the pattern data database 21b in association with each other.

Returning to FIG. 7, the pattern data transmission request receiving unit 22 receives the pattern data transmission requests that are transmitted from the portable telephone 100. The telephone number of the portable telephone 100 in question is included in each pattern data transmission request. Furthermore, a configuration in which the telephone number of the portable telephone 100 is not included in the pattern data transmission request, but is instead acquired by the server device 20 at the time that a connection is established, is also conceivable.

The pattern data extraction unit 23 extracts specified pattern data from a plurality of sets of pattern data on the basis of the model name and operating system name (terminal information) of the portable telephone 100. To describe this in greater detail, the pattern data extraction unit 23 first extracts the model name and operating system name of the portable telephone 100 from the terminal information database 21a of the storage unit 21 using the telephone number that is contained in the pattern data transmission request as a key. Then, the pattern data extraction unit 23 extracts specified pattern data that is to be transmitted to the portable telephone 100 from the pattern data stored in the pattern data database 21b of the storage unit 21 using the model name and operating system name extracted as described above as a key.

The pattern data transmitting unit 24 transmits a list of the pattern data extracted by the pattern data extraction unit 23 to the portable telephone 100. This list of pattern data contains not only the names of the pattern data, but also the degree of danger of computer viruses that have this pattern data, the size of this pattern data, the date on which this pattern data was updated and the like. Furthermore, the pattern data transmitting unit 24 also transmits pattern data selected by the user of the portable telephone 100 from the pattern data extracted by the pattern data extraction unit 23 to the portable telephone 100.

Moreover, the portable telephone 100 of the information transmitting system 2 has a construction similar to that of the portable telephone 100 of the information transmitting system 1 of the abovementioned first embodiment.

Figure 10:
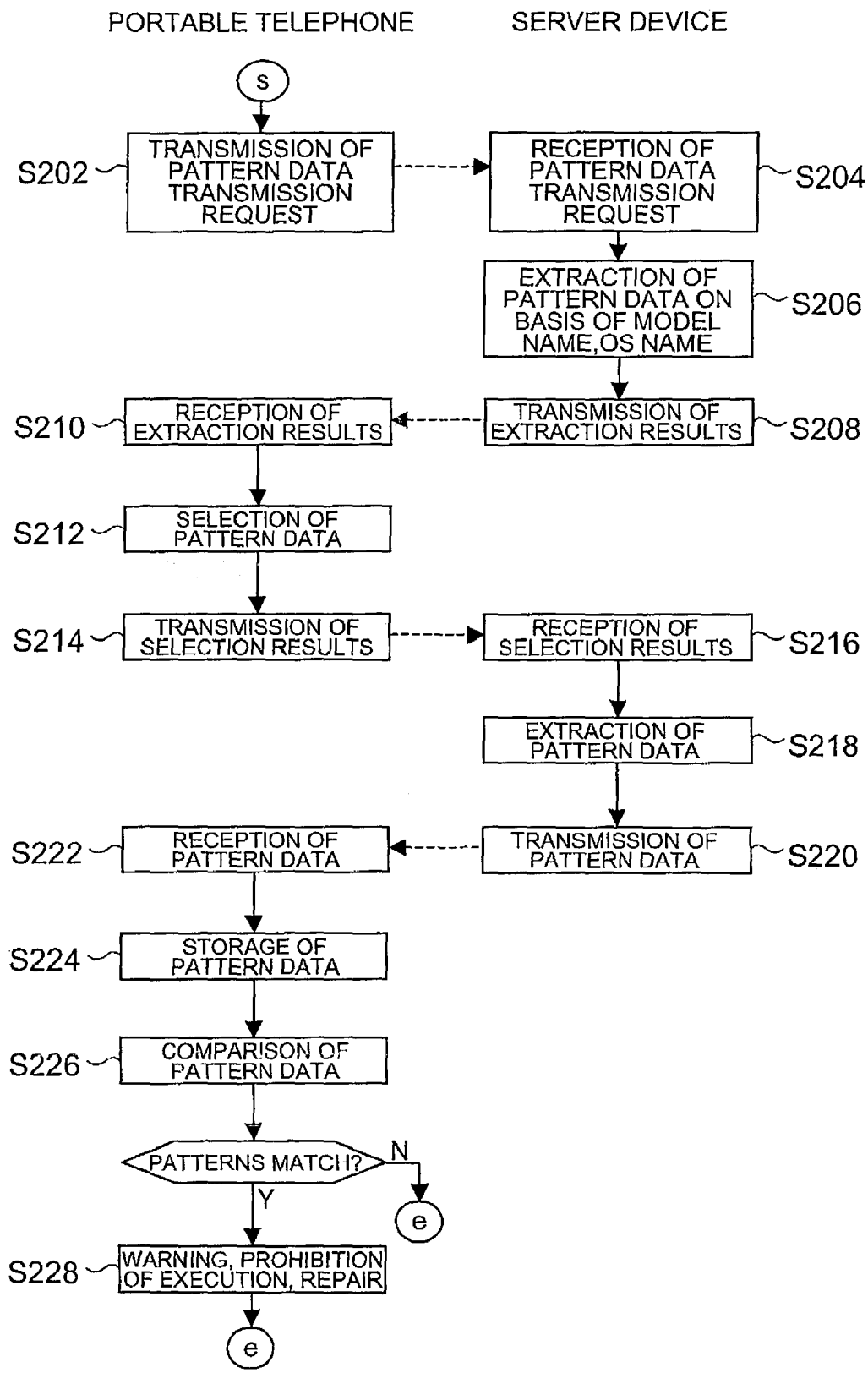
FIG. 10 is a flow chart which shows the flow of the processing of the information transmitting system of the second embodiment.

Next, the operation of the information transmitting system of the present invention will be described, and an information transmitting method constituting an embodiment of the present invention will be described. FIG. 10 is a flow chart which shows the operation of the information transmitting system 2 of the present embodiment. In the information transmitting system 2 of the present embodiment, when pattern data used for the detection of computer viruses is transmitted from the server device 20 to the portable telephone 100, a pattern data transmission request is first transmitted to the server device 10 from the pattern data transmission request transmitting unit 111 of the portable telephone 100 (S102). Here, the telephone number of the portable telephone 100 is included in the pattern data transmission request. The pattern data transmission request transmitted from the portable telephone 100 is received by the pattern data transmission request receiving unit 22 of the server device 20 (S204).

When a pattern data transmission request is received by pattern data transmission request receiving unit 22 of the server device 20, specified pattern data is extracted from a plurality of sets of pattern data by the pattern data extraction unit 23 on the basis of the model name and operating system name of the portable telephone 100 (S206). To describe this in greater detail, the model name and operating system name of the portable telephone 100 are first extracted from the terminal information database 21a of the storage unit 21 using, the telephone number included in the pattern data transmission request as a key. Then, specified pattern data that is to be transmitted to the portable telephone 100 is extracted from the pattern data stored in the pattern data database 21b of the storage unit 21 using the model name and operating system name extracted as described above as a key. For example, in a case where the telephone number of the portable telephone 100 is "090-0000-0000", "Model 1" is first extracted as the model name of this portable telephone 100, and "OS1, Ver 1.05" is extracted as the operating system name of this portable telephone 100, from the terminal information database 21a shown in FIG. 8. Then, "pattern data 1", "pattern data 3" or "pattern data 7" is extracted from the pattern data database 21b shown in FIG. 9 as the pattern data that is to be transmitted to the portable telephone 100.

When specified pattern data is extracted by the pattern data extraction unit 23, a lost of the extracted pattern data is transmitted to the portable telephone 100 from the pattern data transmitting unit 24 (S208). Not only them names of the pattern data, but also the degree of danger of computer viruses that have this pattern data, the size of this pattern data, the date on which this pattern data was updated and the like, are contained in this list of pattern data. The list of pattern data that is transmitted from the pattern data transmitting unit 24 is received by the pattern data transmission request transmitting unit 111 of the portable telephone 100 (S210).

The list of pattern data that is received by the pattern data transmission request transmitting unit 111 of the portable telephone 100 is displayed on the display of the portable telephone 100. When the user of the portable telephone 100 selects specified pattern data from this list of pattern data (S212), the results of this selection are transmitted to the server device 20 from the pattern data transmission request transmitting unit 111 of the portable telephone 100 (S214), and are received by the pattern data transmission request receiving unit 21 of the server device 20 (S216).

When the abovementioned selection results are received by the pattern data transmission request receiving unit 21, the pattern data selected by the user of the portable telephone 100 is again extracted by the pattern data extraction unit 23 as specified pattern data that is to be transmitted to the portable telephone 100 (S218). Subsequently, the processing of S220 through S228 is similar to the processing of S108 through S116 that was described above with reference to FIG. 4

Next, the effect and merits of the information transmitting system of the present embodiment will be described. In the information transmitting system 2 of the present embodiment, as in the information transmitting system 1 of the abovementioned first embodiment, specified pattern data is extracted on the basis of the model name of the portable telephone 100, and the specified pattern data that is thus extracted is transmitted to the portable telephone 100, when pattern data used for the detection of computer viruses is transmitted from the server device 20 to the portable telephone 100. Accordingly, the quantity of pattern data that is transmitted from the server device 20 to the portable telephone 100, the quantity of pattern data that is stored in the portable telephone 100, and the quantity of pattern data that is compared by the portable telephone 100, can be efficiently reduced in accordance with the hardware and software of the portable telephone 100. As a result, the detection of computer viruses in the portable telephone 100 can be accomplished in an efficient manner.

Furthermore, in the information transmitting system 2 of the present embodiment, in particular, specified pattern data is extracted on the basis of the operating system of the portable telephone 100, and the specified pattern data that is thus extracted is transmitted to the portable telephone 100. Accordingly, the quantity of pattern data that is transmitted from the server device 20 to the portable telephone 100, the quantity of pattern data that is stored in the portable telephone 100, and the quantity of pattern data that is compared by the portable telephone 100, can be efficiently reduced in accordance with the operating system of the portable telephone 100 even in cases where the model is the same but the operating system (especially the version of the operating system) that is installed is different.

Furthermore, in the information transmitting system 2 of the present embodiment, a list of the specified pattern data that is extracted by the pattern data extraction unit 23 is transmitted to the portable telephone 100, and pattern data that is selected by the user of the portable telephone 100 from this specified pattern data is transmitted to the portable telephone 100. Accordingly, the user of the portable telephone 100 can also avoid the selection of pattern data that has already been acquired, pattern data for computer viruses thought to have little effect on the portable telephone 100, or the like. As a result, the quantity of pattern data that is transmitted from the server device 20 to the portable telephone 100, the quantity of pattern data that is stored in the portable telephone 100, and the quantity of pattern data that is compared by the portable telephone 100, can be reduced even further. Consequently, the detection of computer viruses in the portable telephone 100 can be accomplished even more efficiently.

In the present embodiment, terminal information relating to the portable telephone 100 is stored in the server device 20. The processing of the storage of this terminal information in the server device 20 will be described below.

Figure 11:
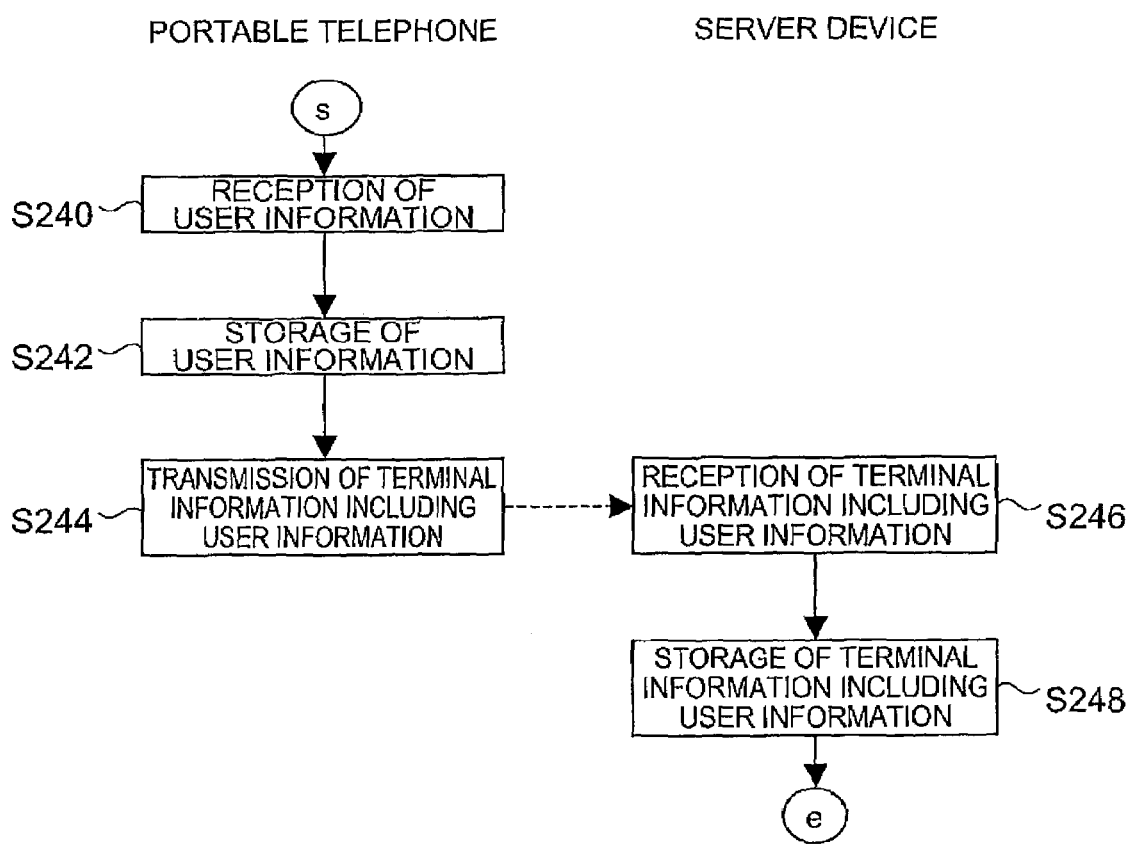
FIG. 11 is a flow chart which shows the processing flow of the storage of terminal information in the server device.

First, processing in which terminal information of the portable telephone in question is stored in the server device 20 from a portable telephone which does not mount a UIM (or SIM), i.e., an IC chip on which user information is recorded, will be described. FIG. 11 is a flow chart which shows the flow of the processing of this storage of terminal information in the server device 20. At the time that a utilization agreement for the portable telephone is concluded, the portable telephone 100 receives user information for the portable telephone 100 (e.g., a telephone number that is assigned to this portable telephone 100) from a server device belonging to a mobile communications business operator or the like (S240). The user information received by the portable telephone 100 is temporarily stored in the memory of the portable telephone 100 (S242).

Subsequently, the user information stored in the memory of the portable telephone 100 is transmitted to the server device 20 as terminal information along with the model name, operating system name and the like of the portable telephone 100, which have been written beforehand into the same memory (S244), and received by the server device 20 (S246). The terminal information received by the server device 20 is stored in the terminal information database 21a of the storage unit 21 of the server device 20 (S248). Furthermore, in cases where the processing of S244 through S246 is not successful because of the conditions of the communications circuit, the processing of S244 through S246 is repeated at fixed time intervals.

Figure 12:
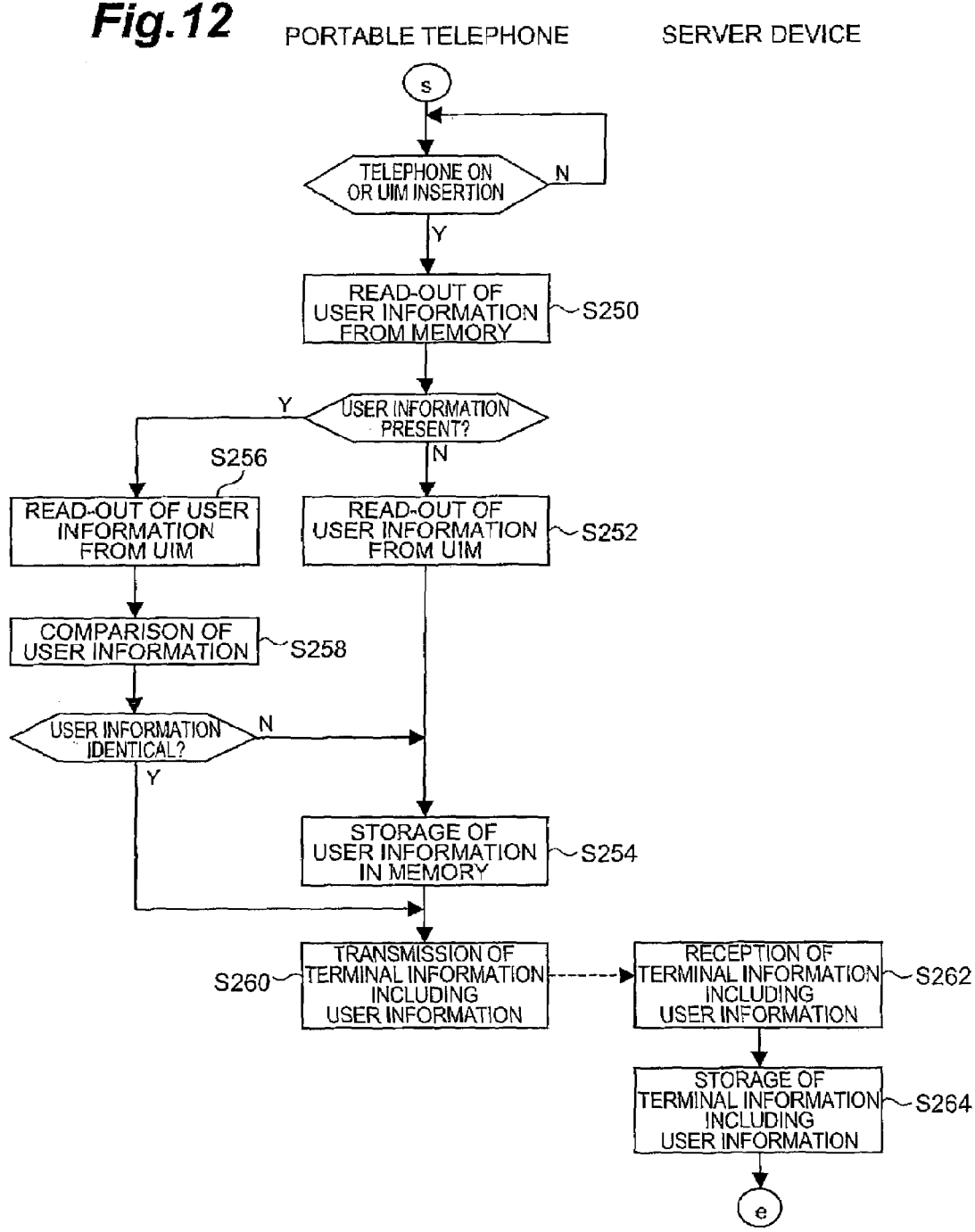
FIG. 12 is a flow chart which shows the processing flow of the storage of terminal information in the server device.

Next, processing in which terminal information of the portable telephone in question is stored in the server device 20 from a portable telephone which mounts a UIM (or SIM), i.e., an IC chip on which user information is recorded, will be described. FIG. 12 is a flow chart which shows the flow of the processing of this storage of terminal information in the server device 20. User information for the UIM in question (for example, the telephone number assigned to this UIM) is stored beforehand in the UIM. When the power supply of the portable telephone 100 is switched on with the UIM inserted (or when the UIM is inserted into the portable telephone 100 in a state in which the power supply is switched on), user information is read out from the memory of the portable telephone 100 (S250).

Here, in cases where user information is not read out from the memory of the portable telephone 100, i.e., in cases where such user information is not stored in the memory of the portable telephone 100, this user information is read out from the UIM (S252), and the user information that has been read out from the UIM is stored in the memory of the portable telephone 100 (S254).

On the other hand, in cases where user information is read out from the memory of the portable telephone 100, i.e., in cases where such user information is stored in the memory of the portable telephone 100, user information is read out from the UIM (S256), and this user information read out from the UIM is compared with user information read out from the memory of the portable telephone 100 (S258) In cases where this comparison of the user information read out from memory of the portable telephone 100 and user information read out from the UIM shows that the two sets of information are different, the user information that is read out from the UIM is stored in the memory of the portable telephone 100 (S254). In other words, the user information that is stored in the memory of the portable telephone 100 is updated to the user information that is read out from the UIM. On the other hand, in cases where both sets of user information are the same, the user information that is stored in the memory of the portable telephone 100 is not updated.

Subsequently, the user information that is stored in the memory of the portable telephone 100 is transmitted to the server device 20 as terminal information along with the model name, operating system name and the like of the portable telephone 100 in question that have been written into the same memory beforehand (S260), and this information is received by the server device 20 (S262). The terminal information that is received by the server device 20 is stored in the terminal information database 21a of the storage unit 21 of the server device 20 (S264). Furthermore, in cases where the processing of S260 through S262 is not successful because of the conditions of the communications circuit, the processing of S260 through S262 is repeated at fixed time intervals.

Furthermore, in the information transmitting system 2 of the present invention, specified pattern data is extracted on the basis of the model name or operating system name of the portable telephone 100; however, it would also be possible to devise the system so that this pattern data is extracted on the basis of other terminal information such as the name of the system control program (including version information) of the device driver or the like, service agreement information for the use of the portable telephone 100, communications history of the user of the portable telephone 100 or the like.

Third Embodiment

Next, an information transmitting system constituting a third embodiment of the present invention will be described. Furthermore, the information transmitting system of the present embodiment includes a server device that constitutes an embodiment of the present invention.

First, the construction of the information transmitting system of the present embodiment will be described. The hardware construction of the information transmitting system of the present embodiment is similar to the hardware construction of the information transmitting system of the abovementioned first embodiment that was described with reference to FIGS. 1 and 30.

Figure 13:
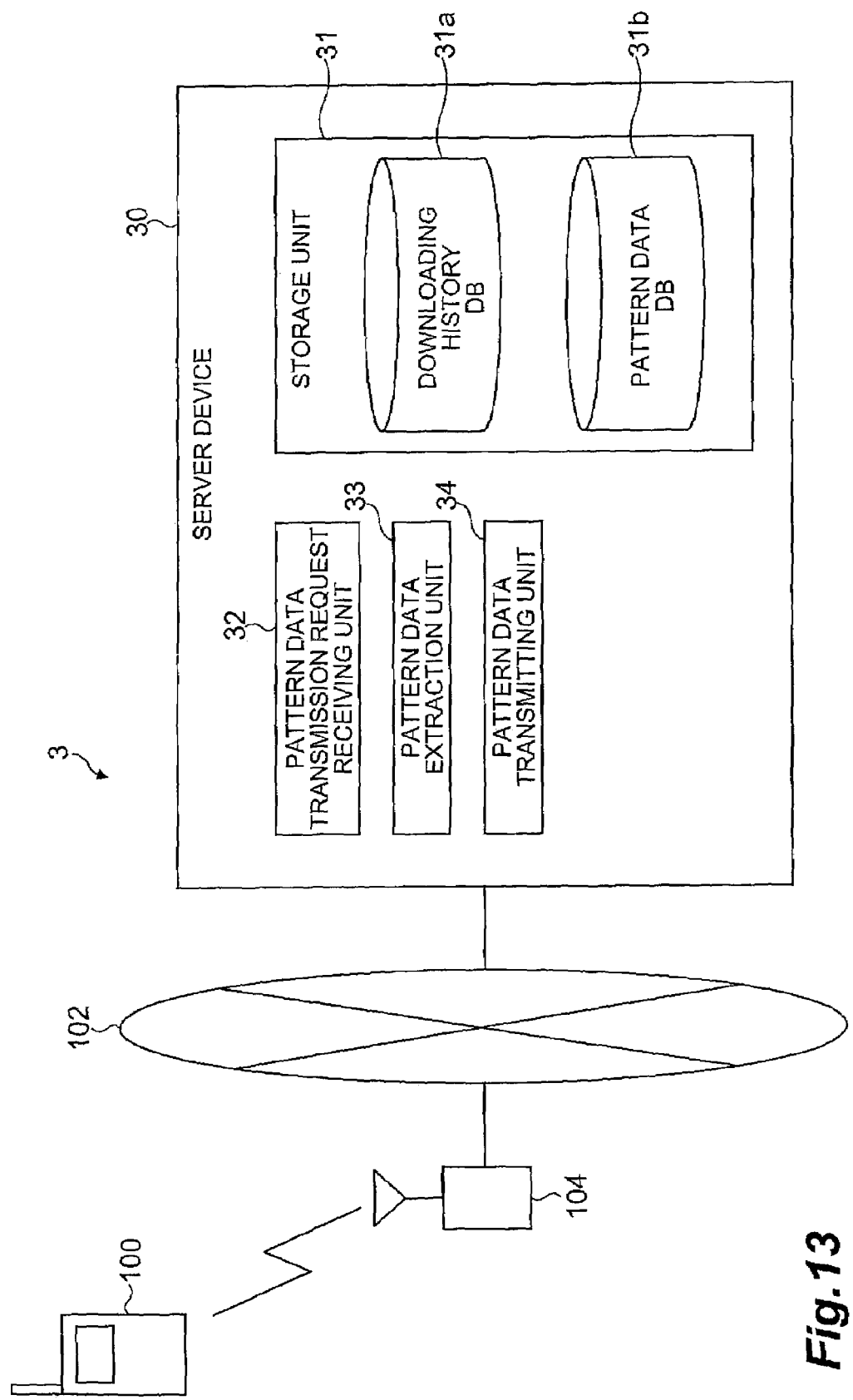
FIG. 13 is a system structural diagram of the information transmitting system of the third embodiment.

FIG. 13 is a system structural diagram of the information transmitting system 3 of the present embodiment. The server device 30 of the information transmitting system 3 is a server device which transmits pattern data used for the detection of computer viruses to a portable telephone 100; in functional terms, this server device 30 comprises a storage unit 31, a pattern data transmission request receiving unit 32, a pattern data extraction unit 33 (extraction means) and a pattern data transmitting unit 34 (transmitting means). Here, the storage unit 31 corresponds to the storage device 10c shown in FIG. 1. Furthermore, the pattern data transmission request receiving unit 32, pattern data extraction unit 33 and pattern data transmitting unit 34 are realized as a result of software stored in the storage device 10c shown in FIG. 1 being executed by the CPU 10a. These respective constituent elements will be described in detail below.

A downloading history database 31a and a pattern data database 32b are stored in the storage unit 31. FIG. 14 is a structural diagram of the downloading history database 31a. The telephone numbers of portable telephones and the names of application programs that have been downloaded into these portable telephones (i.e., that have been received by these portable telephones) are stored in association with each other in the downloading history database 31a. Here, the server device 30 has the function of an application server that transmits application programs to the portable telephone; each time that an application program is downloaded into the portable telephone from the server device 30, the downloading history database 31a is updated.

FIG. 15 is a structural diagram of the pattern data database 31b. Pattern data and the names of application programs that are the object of detection of the presence or absence of computer viruses using this pattern data are stored in association with each other in the pattern data database 31b.

Returning to FIG. 13, the pattern data transmission request receiving unit 32 receives pattern data transmission requests that are transmitted from the portable telephone 100. The telephone number of the portable telephone 100 is included in these pattern data transmission requests. Furthermore, a configuration in which the telephone number of the portable telephone 100 is not included in the pattern data transmission requests, but is instead acquired by the server device 30 at the time that a connection is established, is also conceivable.

The pattern data extraction unit 33 extracts specified pattern data from a plurality of sets of pattern data on the basis of the downloading history of application programs (terminal information) in the portable telephone 100. To describe this in greater detail, the packet transmitting device 33 first extracts the names of application programs that have been downloaded into the portable telephone 100 from the downloading history database 31a of the storage unit 31 using the telephone number contained in the pattern data transmission request as a key. Then, the pattern data extraction unit 33 extracts pattern data for computer viruses in which the abovementioned application programs are the object of detection from the pattern data that is stored in the pattern data database 31b of the storage unit 31 using the application programs names extracted as described above as a key.

The pattern data transmitting unit 34 transmits the pattern data extracted by the pattern data extraction unit 33 to the portable telephone 100.

Furthermore, the portable telephone 100 of the information transmitting system 3 has a construction similar to that of the portable telephone 100 of the information transmitting system 1 of the abovementioned first embodiment.

Figure 16:
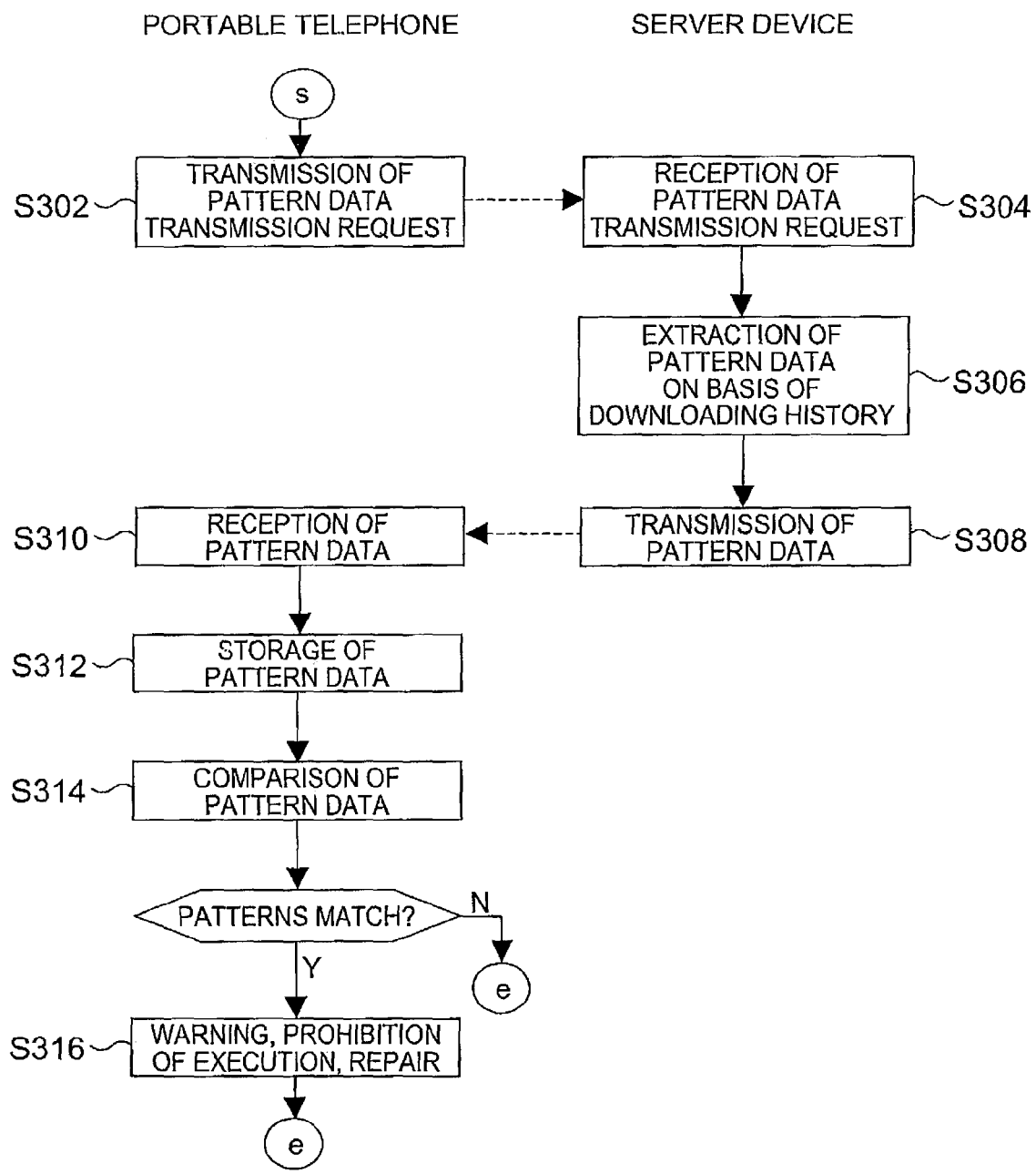
FIG. 16 is a flow chart which shows the flow of the processing of the information transmitting system of the third embodiment.

Next, the operation of the information transmitting system of the present embodiment will be described, and an information transmitting method constituting an embodiment of the present invention will be described. FIG. 16 is a flow chart which shows the operation of the information transmitting system 3 of the present embodiment. In the information transmitting system 3 of the present invention, when pattern data for the detection of computer viruses is transmitted from the server device 30 to the portable telephone 100, a pattern data transmission request is first transmitted to the server device 10 from the pattern data transmission request transmitting unit 111 of the portable telephone 100 (S302). Here, the telephone number of the portable telephone 100 is included in the pattern data transmission request. The pattern data transmission request that is transmitted from the portable telephone 100 is received by the pattern data transmission request receiving unit 32 of the server device 30 (S304).

When a pattern data transmission request is received by the pattern data transmission request receiving unit 32 of the server device 30, specified pattern data is extracted from a plurality of sets of patter data by the pattern data extraction unit 33 on the basis of the downloading history of application programs in the portable telephone 100 (S306). To describe this in greater detail, the names of application programs that have been downloaded into the portable telephone 100 are extracted from the downloading history database 31a of the storage unit 31 using the telephone number included in the pattern data transmission request as a key. Then, pattern data for computer viruses in which the abovementioned application programs are the object of detection are extracted from the pattern data database 31b of the storage unit 31 using the application program names that have been extracted as described above as a key. For example, in a case where the telephone number of the portable telephone 100 is "090-0000-0000", "application program 1" and "application program 2" are first extracted from the downloading history database 31a shown in FIG. 14 as the names of application programs that have been downloaded into the abovementioned portable telephone 100. Then, from the pattern data database 31b shown in FIG. 15, "pattern data 1", "pattern data 3" and "pattern data 5" are extracted as pattern data for computer viruses in which "application program 1" is the object of detection, and "pattern data 6" is extracted as pattern data for computer viruses in which "application program 2" is the object of detection. Subsequently, the processing of S308 through S316 is similar to the processing of S108 through S116 described with reference to FIG. 4.

Next, the effects and merits of the information transmitting system of the present embodiment will be described. Computer viruses include many viruses that depend on specified application programs. In this regard, in the information transmitting system 3 of the present embodiment, specified pattern data is extracted on the basis of the downloading history of application programs in the portable telephone 100, and the pattern data that is thus extracted is transmitted to the portable telephone 100. Accordingly, the quantity of pattern data that is transmitted from the server device 30 to the portable telephone 100, the quantity of pattern data that is stored in the portable telephone 100, and the quantity of data that is compared by the portable telephone 100, can be efficiently reduced in accordance with the application programs that have been downloaded into this portable telephone 100. As a result, the detection of computer viruses in the portable telephone 100 can be accomplished in a more efficient manner.

Furthermore, in the information transmitting system 3 of the present embodiment, pattern data is extracted on the basis of the downloading history of application programs, and the extracted pattern data is transmitted to the portable telephone 100; however, this system may also be devised so that pattern data is extracted on the basis of the downloading history of data other than application programs, and so that the pattern data thus extracted is transmitted to the portable telephone 100. Examples of suitable data other than application programs include system control programs of operating systems, device drivers or the like, and data files such as document files, spread sheets or the like.

Fourth Embodiment

Next, an information transmitting system constituting a fourth embodiment of the present invention will be described. Furthermore, the information transmitting system of the present embodiment includes a server device that constitutes an embodiment of the present invention.

First, the construction of the information transmitting system of the present embodiment will be described. The hardware construction of the information transmitting system of the present embodiment is similar to the hardware construction of the information transmitting system 1 of the abovementioned first embodiment.

Figure 17:
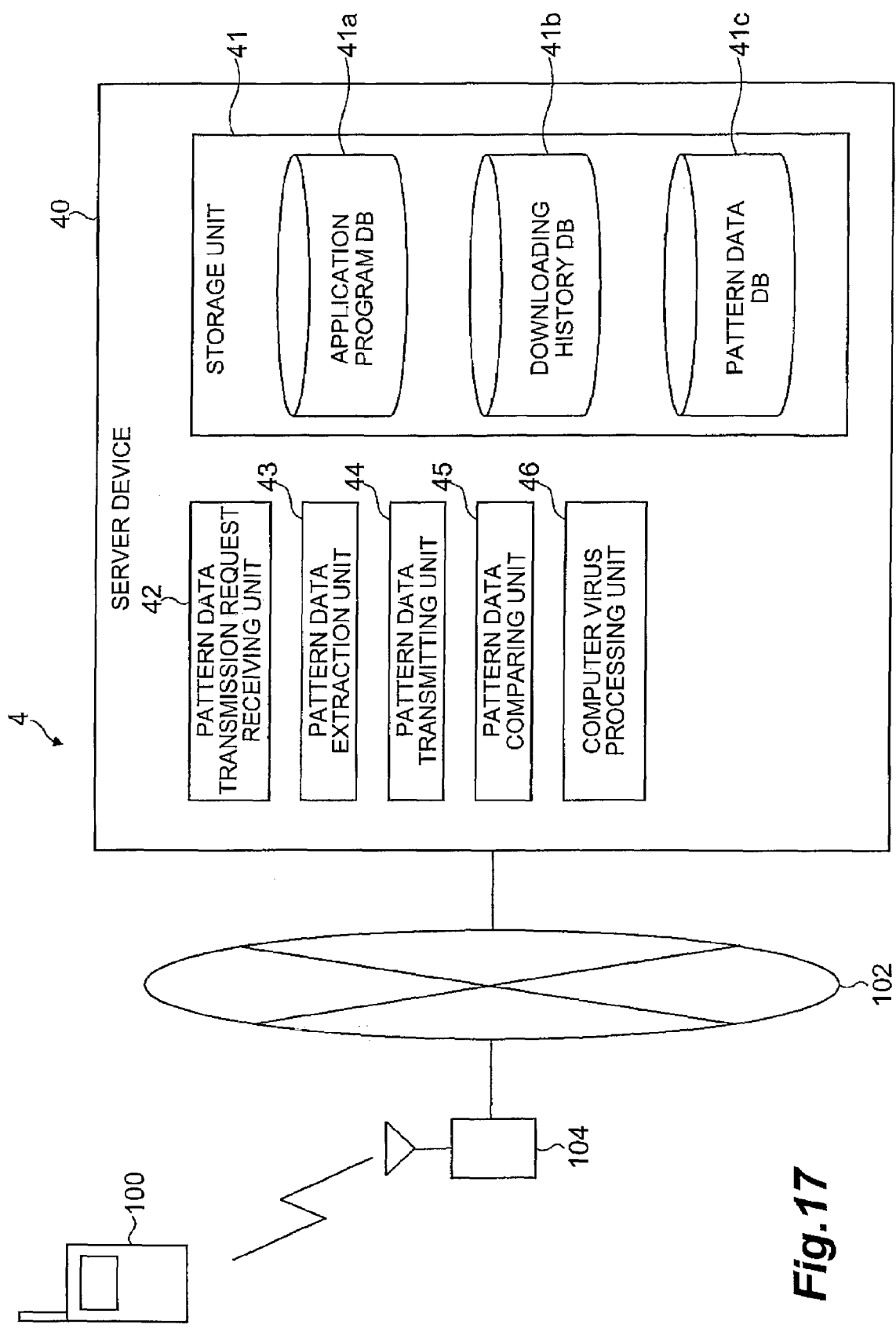
FIG. 17 is a system structural diagram of the information transmitting system of the fourth embodiment.

FIG. 17 is a system structural diagram of the information transmitting system 4 of the present embodiment. The server device 40 of the information transmitting system 4 is a sever device which transmits pattern data used for the detection of computer viruses to a portable telephone 100; in functional terms, this server device 40 comprises a storage unit 41, a pattern data transmission request receiving unit 42, a pattern data extraction unit 43 (extraction means), a pattern data transmitting unit 44 (transmitting means), a pattern data comparing unit 45 (detection means) and a computer virus processing unit 46. Here, the storage unit 41 corresponds to the storage device 10c shown in FIG. 1. Furthermore, the pattern data transmission request receiving unit 42, pattern data extraction unit 43, pattern data transmitting unit 44, pattern data comparing unit 45 and computer virus processing unit 46 are realized as a result of software that is stored in the storage device shown in FIG. 1 being executed by the CPU 10a. These respective constituent elements will be described in detail below.

An application program database 41a, a downloading history database 41b and a pattern data database 41c are stored in the storage unit 41. FIG. 18 is a structural diagram of the application program database 41a. The names of application programs that are present in the server device 40 are stored in the application program database 41a. The downloading history database 41b has a construction similar to that of the downloading history database 31a described with reference to FIG. 14.

FIG. 19 is a structural diagram of the pattern data database 41c. Pattern data and the names of application programs that are the object of detection of the presence or absence of computer viruses using the abovementioned pattern data are stored in the pattern data database 41c.

Returning to FIG. 17, the pattern data transmission request receiving unit 42 receives pattern data transmission requests that are transmitted from the portable telephone 100. The telephone number of the portable telephone 100 is included in these pattern data transmission requests. Furthermore, a configuration in which the telephone number of the portable telephone 100 is not included in the pattern data transmission request, but is instead acquired by the server device 40 at the time that a connection is established, is also conceivable.

The pattern data extraction unit 43 extracts specified pattern data from a plurality of sets of pattern data on the basis of the downloading history of application programs in the portable telephone 100. To describe this in greater detail, the pattern data extraction unit 43 first extracts the names of application programs that have been downloaded into the portable telephone 100 from the downloading history database 41b of the storage unit 41 using the telephone number contained in the pattern data transmission request as a key. The pattern data extraction unit 43 then extracts pattern data for computer viruses in which the abovementioned application programs are the object of detection from the pattern data that is stored in the pattern data database 41c of the storage unit 41 using the application program names that have been extracted as described above as a key.

The pattern data transmitting unit 44 refers to the application program database 41a of the storage unit 41, and judges whether or not the respective application programs extracted by the pattern data extraction unit 43 are present in the server device. In the case of application programs that are not present in the server device, it cannot be detected whether or not a computer virus is contained in the server device 40. Accordingly, the pattern data transmitting unit 44 transmits pattern data for computer viruses in which application programs that are the object of detection are not present in the server device 40 to the portable telephone 100. On the other hand, in the case of application programs that are present in the server device 40, it can be detected whether or not a computer virus is contained in the server device 40. Accordingly, in the case of pattern data for computer viruses in which application programs that are present in the server device 40 are the object of detection, the pattern data transmitting unit 44 transmits this pattern data to the portable telephone 100.

The pattern data comparing unit 45 uses the pattern data extracted by the pattern data extraction unit 43 to detect whether or not a computer virus is present in the application programs that are present in the server device 40. To describe this in greater detail, the application programs and pattern data extracted by the pattern data extraction unit 43 are compared, and a judgement is made as to whether or not the application programs have portions that match the above mentioned pattern data. In cases where the application programs have portions that match the above mentioned pattern data, the pattern data comparing unit 45 judges that a computer virus is contained in the abovementioned application programs; in cases where the abovementioned application programs have no portions that match the abovementioned pattern data, the pattern data comparing unit 45 judges that no computer virus is contained in the abovementioned application programs.

In cases where it is judged by pattern data comparing unit 45 that a computer virus is contained in a specified application program, the computer virus processing unit 46 performs processing that sends a warning to the manager of the server device 40, processing that prohibits downloading of the application program in question, processing that deletes this application program or the like, on the basis of predetermined set information. Furthermore, the computer virus processing unit 46 transmits a warning indicating that a computer virus is contained in the specified application program to the abovementioned portable telephone 100.

Furthermore, the portable telephone 100 of the information transmitting system 4 has a construction that is similar to that of the portable telephone 100 of the information transmitting system 1 of the abovementioned first embodiment.

Figure 20:
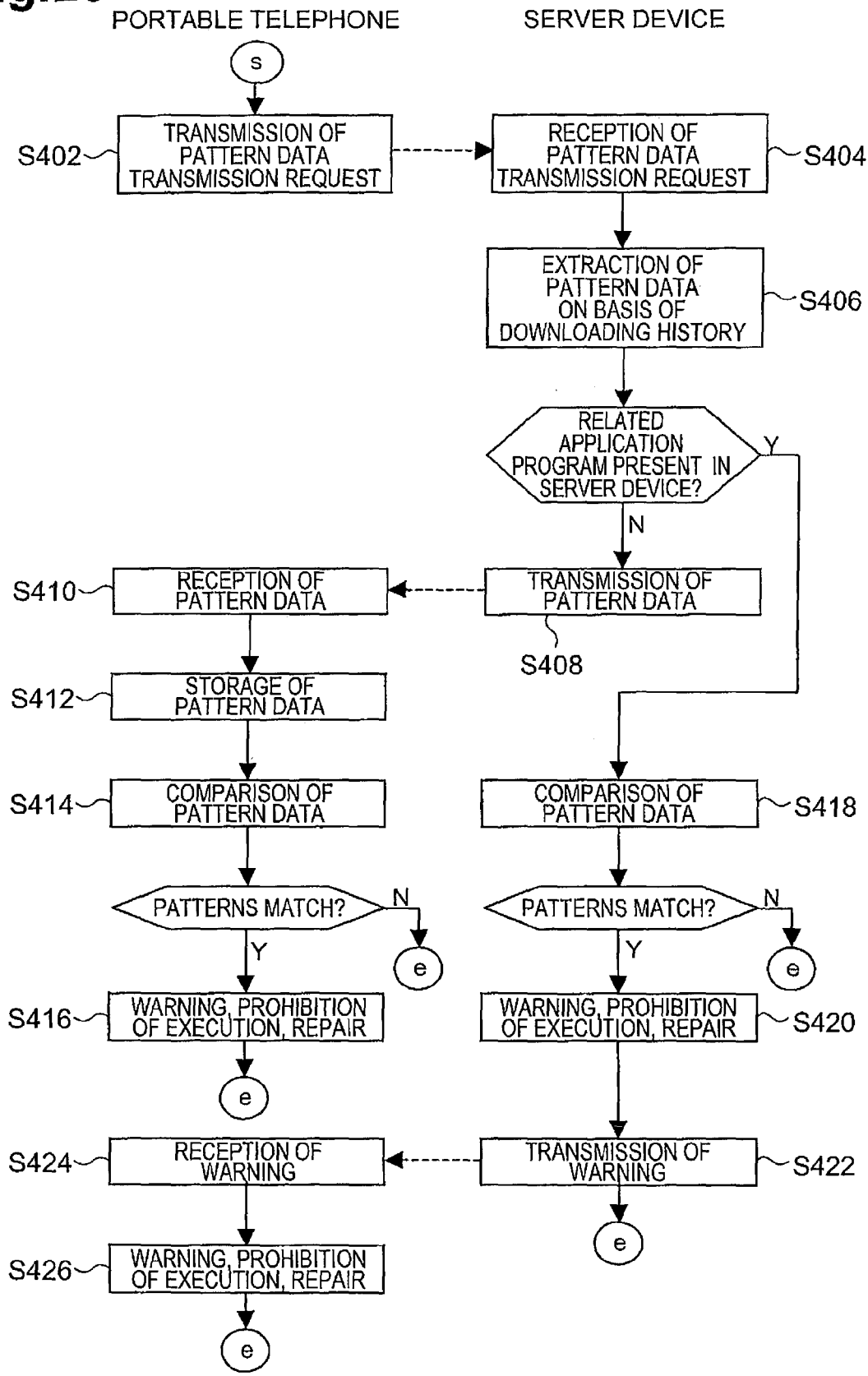
FIG. 20 is a flow chart which shows the flow of the processing of the information transmitting system of the fourth embodiment.

Next, the operation of the information transmitting system of the present embodiment will be described, and an information transmitting method constituting an embodiment of the present invention will be described. FIG. 20 is a flow chart which illustrates the operation of the information transmitting system 4 of the present embodiment. In the information transmitting system 4 of the present embodiment, when pattern data for the detection of computer viruses is transmitted from the server device 40 to the portable telephone 100, a pattern data transmission request is first transmitted to the server device 40 from the pattern data transmission request transmitting unit 111 of the portable telephone 100 (S402). Here, the telephone number of the portable telephone 100 is included in the pattern data transmission request. The pattern data transmission request that is transmitted from the portable telephone 100 is received by the pattern data transmission request receiving unit 42 of the server device 40 (S404).

When a pattern data transmission request is received by the pattern data transmission request receiving unit 42 of the server device 40, specified pattern data is extracted by the pattern data extraction unit 43 from a plurality of sets of pattern data on the basis of the downloading history of application programs in the portable telephone 100 (S406). To describe this is greater detail, the names of application programs that have been downloaded into the portable telephone 100 are first extracted from the downloading history database 41b of the storage unit 41 using the telephone number included in the pattern data transmission request as a key. Next, pattern data for computer viruses in which the abovementioned application programs are the object of detection is extracted from the pattern data stored in the pattern data database 41c of the storage unit 41 using the application program names that have been extracted as described above as a key. For example, in a case where the telephone number of the portable telephone 100 is "090-0000-0000", "application program 1" and "application program 2" are first extracted as the names of application programs that have been downloaded into the portable telephone 100 from the downloading history database 41b, which has a construction similar to that of the downloading history database 31a shown in FIG. 14. Then, from the pattern data database 41c shown in FIG. 19, "pattern data 1" is extracted as pattern data for a computer virus in which "application program 1" is the object of detection, and "pattern data 2" is extracted as pattern data for a computer virus in which "application program 2" is the object of detection.

Next, while reference is made to the application program database 41a of the storage unit 41, a judgement is made by the pattern data transmitting unit 44 as to whether or not the respective application programs extracted by the pattern data extraction unit 43 are present in the server device 40. Here, in the case of application programs that are not present in the server device 40, it cannot be detected whether or not a computer virus is contained in the server device. Accordingly, in the case of pattern data for computer viruses in which application programs that are not present in the server device 40 are the object of detection, this pattern data is transmitted to the portable telephone 100 (S408). Furthermore, in the case of pattern data for computer viruses in which application programs that are present in the server device 40 are the object of detection, this pattern data is not transmitted to the portable telephone 100. Subsequently, the process of S410 through S416 is similar to the processing of S110 through S116 described with reference to FIG. 4.

Meanwhile, in the case of application programs that are present in the server device 40, it can be detected whether or not a computer virus is contained in the server device 40. Accordingly, it is detected by the patter data comparing unit 45 whether or not a computer virus is contained (S418). To describe this in greater detail, the pattern data extracted by the pattern data extraction unit 43 is compared with the application programs, and a judgement is made as to whether or not the application programs have portions that match the abovementioned pattern data. Here, in cases where the application programs have portions that match the abovementioned pattern data, it is judged that a computer virus is contained in these application programs, while in cases where the application programs do not have portions that match the abovementioned pattern data, it is judged that no computer virus is contained in these application programs.

For example, in a case where the two application programs "application program 1" and "application program 2" are extracted by the pattern data extraction unit 43, it is found that "application program 2" is not present in the server device 40 when reference is made to the application program database 41a shown in FIG. 18. Accordingly, "pattern data 2", which is pattern data for a computer virus in which "application program 2" is the object of detection is transmitted to the portable telephone 100. On the other hand, since "application program 1" is present in the server device 40, "pattern data 1", which is pattern data for a computer virus in which "application program 1" is the object of detection, is not transmitted to the portable telephone 100, and this "pattern data 1" is used by the pattern data comparing unit 45 of the server device 40 to detect whether or not a computer virus is contained in "application program 1".

In cases where it is judged by the pattern data comparing unit 45 that a computer virus is contained in a specified application program, processing that sends a warning to the manager of the server device 40, processing that prohibits downloading of the application program in question, processing that deletes this application program or the like is performed by the computer virus processing unit 46 on the basis of predetermined set information (S420). Furthermore, in cases where it is judged by the pattern data comparing unit 45 that a computer virus is contained in a specified application program, a warning indicating that a computer virus is contained in this specified application program is transmitted to the portable telephone 100 from the computer virus processing unit 46 (S422), and this warning is received by the computer virus processing unit 115 of the portable telephone 100 (S424).

In the portable telephone 100, when the abovementioned warning is received by the portable telephone 100, processing that sends a warning to the user of the portable telephone 100, processing that prohibits execution of the application program in question, processing that repairs this application program or the like is performed by the computer virus processing unit 115 on the basis of predetermined set information (S426).

Next, the effects and merits of the information transmitting system of the present embodiment will be described. In the information transmitting system 4 of the present embodiment, as in the information transmitting system 3 of the abovementioned third embodiment, specified pattern data is extracted on the basis of the downloading history of application programs in the portable telephone 100, and the specified pattern data thus extracted is transmitted to the portable telephone 100. Accordingly, the quantity of pattern data that is transmitted from the server device 40 to the portable telephone 100, the quantity of pattern data that is stored in the portable telephone 100, and the quantity of pattern data that is compared by the portable telephone 100, can be efficiently reduced in accordance with the application programs that have been downloaded into this portable telephone 100. As a result, the detection of computer viruses in the portable telephone 100 can be accomplished in an efficient manner.

Furthermore, the information transmitting system 4 of the present embodiment is devised so that in the case of application programs that are present in the server device 40, it is detected in the server device 40 whether or not a computer virus is contained [in the application programs]. Accordingly, in the case of application programs that are present in the server device, pattern data that is used to detect whether or not a computer virus is contained in the application programs need not be transmitted to the portable telephone 100. As a result, the quantity of pattern data that is transmitted from the server device 40 to the portable telephone 100, the quantity of pattern data that is stored in the portable telephone 100 and the quantity of data that is compared by the portable telephone 100 can be further reduced.

Fifth Embodiment

Next, an information transmitting system constituting a fifth embodiment of the present invention will be described. Furthermore, the information transmitting system of the present embodiment includes a server device that constitutes an embodiment of the present invention.

First, the construction of the information transmitting system of the present embodiment will be described. The hardware construction of the information transmitting system of the present embodiment is similar to the hardware construction of the information transmitting system of the abovementioned first embodiment described with reference to FIGS. 1 and 30.

Figure 21:
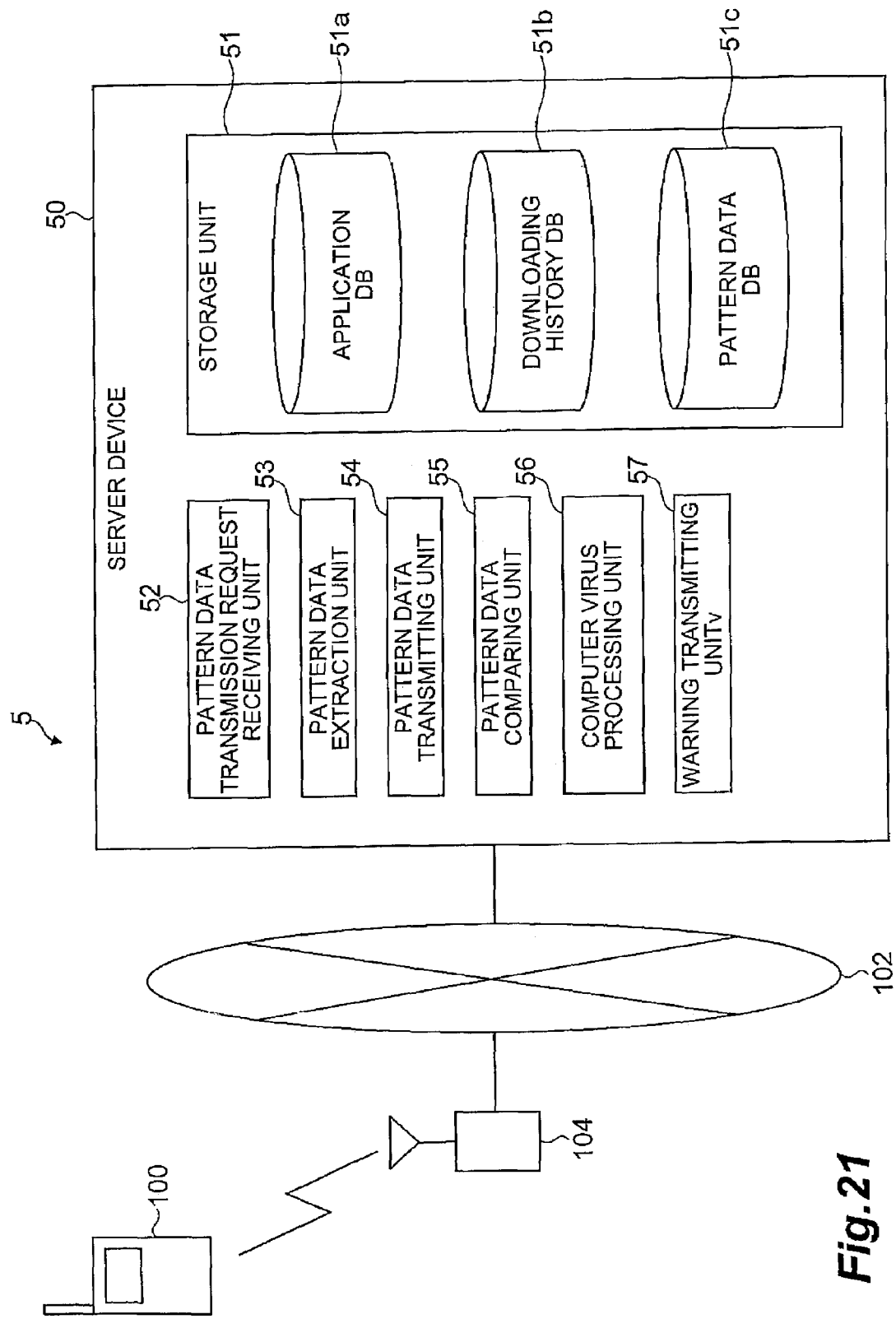
FIG. 21 is a system structural diagram of the information transmitting system of the fifth embodiment.

FIG. 21 is a system structural diagram of the information transmitting system 5 of the present embodiment. The server device 50 of the information transmitting system 5 is a server device which transmits pattern data used for the detection of computer viruses to a portable telephone 100; in functional terms, this server device 50 comprises a storage unit 51 (first storing means), a pattern data transmission request receiving unit 52, a pattern data extraction unit 53 (extraction means), a pattern data transmitting unit 54 (transmitting means), a pattern data comparing unit 55 (detection means), a computer virus processing unit 56, and a warning transmitting unit 57 (first warning transmitting means). Here, the storage unit 51 corresponds to the storage device 10c shown in FIG. 1. Furthermore, the pattern data transmission request receiving unit 52, pattern data extraction unit 53, pattern data transmitting unit 54, pattern data comparing unit 55, computer virus processing unit 56 and warning transmitting unit 57 are realized as a result of software stored in the storage device 10c shown in FIG. 1 being executed by the CPU 10a.

The storage unit 51 (including an application program database 51a, downloading history database 51b and pattern data database 51c), pattern data transmission request receiving unit 52, pattern data extraction unit 53, pattern data transmitting unit 54, pattern data comparing unit 55 and computer virus processing unit 56 have constructions that are respectively similar to those of the storage unit 41, pattern data transmission request receiving unit 42, pattern data extraction unit 43, pattern data transmitting unit 44, pattern data comparing unit 45 and computer virus processing unit 46 of the information transmitting system 4 of the abovementioned fourth embodiment.

In cases where it is confirmed by the pattern data comparing unit 55 that a computer virus is contained in a specified application program, the warning transmitting unit 57 transmits warnings to other portable telephones that have downloaded (received) the abovementioned specified application program on the basis of the downloading history stored in the downloading history data bas 51b of the storage unit 51.

Furthermore, the portable telephone 100 of the information transmitting system 5 has a construction similar to that of the portable telephone 100 of the information transmitting system 1 of the abovementioned first embodiment.

Figure 22:
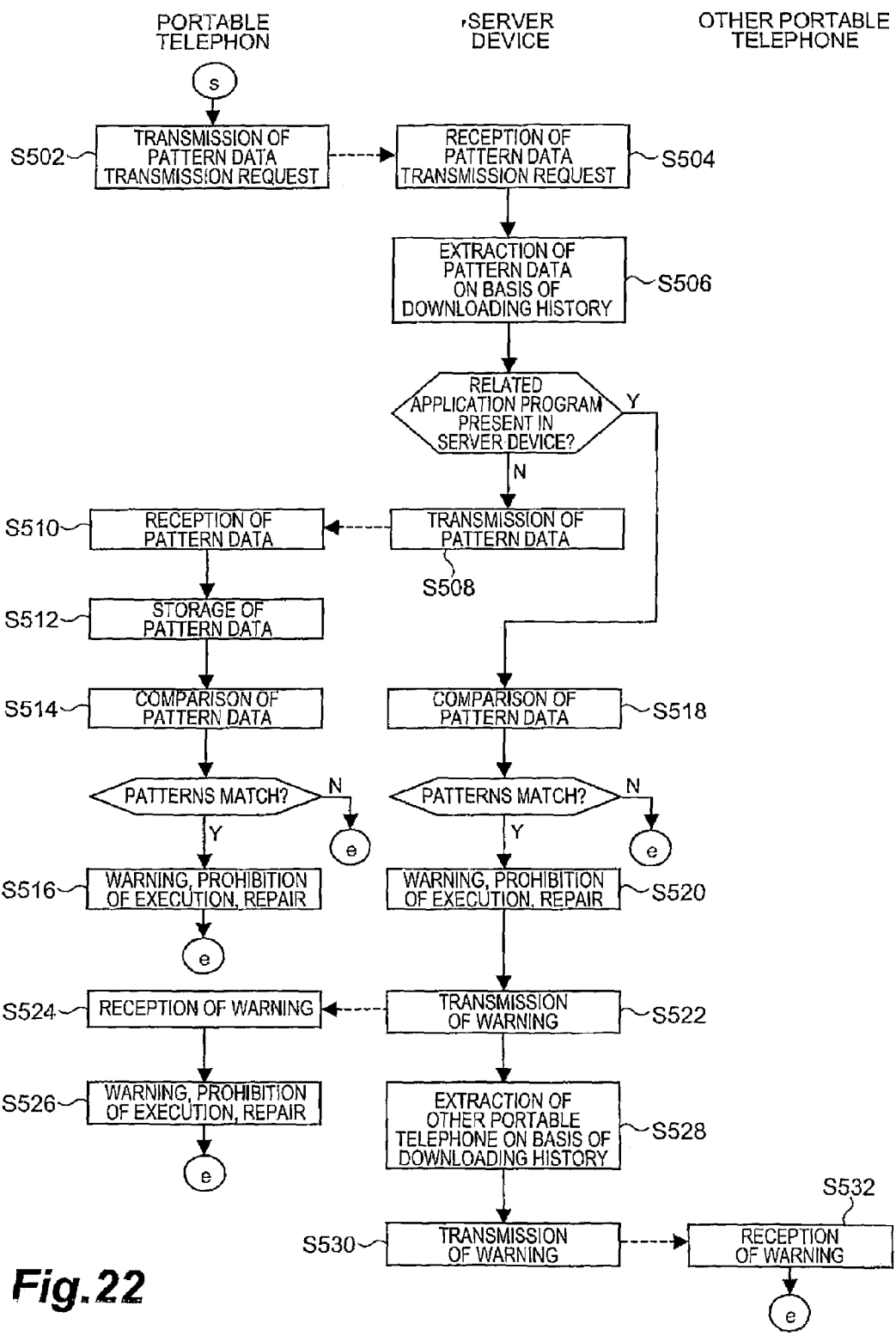
FIG. 22 is a flow chart which shows the flow of the processing of the information transmitting system of the fifth embodiment.

Next, the operation of the information transmitting system of the present embodiment will be described, and an information transmitting method constituting an embodiment of the present invention will also be described. FIG. 22 is a flow chart which shows the operation of the information transmitting system 5 of the present embodiment. The processing of S502 through S526 in the information transmitting system 5 of the present embodiment is similar to the processing of S402 through S426 described with reference to FIG. 20.

When it is confirmed by the pattern data comparing unit 55 that a computer virus is contained in a specified application program, a warning is transmitted to the portable telephone 100 that has received the pattern data transmission request (S522); furthermore, warnings are also transmitted by the warning transmitting unit 57 to other portable telephones that have downloaded the abovementioned specified application program (S530), and received by these other portable telephones (S532). To describe this in greater detail, the downloading history database 51b of the storage unit 51 is first searched using the name of the application program that has been confirmed to contain a computer virus as a key, and the telephone numbers of other portable telephones that have downloaded the abovementioned specified application program are extracted. Then, a warning indicating that a computer virus has been detected in the abovementioned specified application program is transmitted to the portable telephones specified by the abovementioned telephone numbers that have been extracted. Furthermore, pattern data used to detect whether or not a computer virus is contained in the abovementioned specified application program may also be transmitted to the abovementioned other portable telephones along with the abovementioned warning. Moreover, portable telephones that are the object of warning transmission may also be further narrowed down on the basis of the model names, maker names, operating system names or the like of the portable telephones from other portable telephones that have downloaded the abovementioned specified application program.

For example, let us assume that a computer virus was detected in "application program 1" when the detection of computer viruses was performed by the pattern data comparing unit 55 on the basis of a pattern data transmission request transmitted from a portable telephone 100 with a telephone number of "090-0000-0000". When reference is made to the downloading history database 51b, which has the same construction as the downloading history database 31a shown in FIG. 14, it is found that not only the portable telephone 100 with a telephone number of "090-0000-0000", but also a portable telephone 100 with a telephone number of "090-0000-0001", has downloaded "application program 1". As a result, a warning is transmitted to the portable telephone 100 that has a telephone number of "090-0000-0001".

Next, the effects and merits of the information transmitting system of the present embodiment will be described. Like the information transmitting system 3 of the abovementioned third embodiment, the information transmitting system 5 of the present embodiment also extracts specified pattern data on the basis of the downloading history of application programs in the portable telephone 100, and transmits the specified pattern data thus extracted to a portable telephone 100. Accordingly, the quantity of pattern data that is transmitted from the server device 50 to the portable telephone 100, the quantity of pattern data that is stored in the portable telephone 100, and the quantity of data that is compared by the portable telephone 100, can be efficiently reduced in accordance with the application programs that have been downloaded into this portable telephone 100. As a result, the detection of computer viruses in the portable telephone 100 can be accomplished in an efficient manner.

Furthermore, in cases where it is confirmed that a computer virus is contained in a specified application program in a certain portable telephone 100, it is highly possible that this computer virus is also present in other portable telephones that have downloaded this specified application program. In this respect, the information transmitting system 5 of the present embodiment transmits warnings to other portable telephones that have downloaded the abovementioned specified application program on the basis of the downloading history of application programs. Accordingly, a warning can also be sent to other portable telephones in which there is a high possibility that a computer virus is present. As a result, other portable telephones that have received such a warning can take early countermeasures against the computer virus so that the spread of the computer virus can be prevented.

In the information transmitting system 5 of the abovementioned embodiment, the pattern data comparing unit 55 of the server device 50 detects the presence or absence of a computer virus, and the warning transmitting unit 57 transmits a warning to other portable telephones on the basis of the results of the abovementioned detection. However, it would also be possible to devise this system so that the portable telephone 100 detects the presence or absence of a computer virus, after which the portable telephone 100 notifies the server device 50 of the detection results, and the warning transmitting unit 57 transmits a warning to other portable telephones on the basis of this notification.

Sixth Embodiment

Next, an information transmitting system constituting a sixth embodiment of the present invention will be described. Furthermore, the information transmitting system of the present embodiment includes a server device that constitutes an embodiment of the present invention.

First the construction of the information transmitting system of the present embodiment will be described. The hardware construction of the information transmitting system of the present embodiment is similar to the hardware construction of the information transmitting system 1 of the abovementioned first embodiment that was described with reference to FIGS. 1 and 30.

Figure 23:
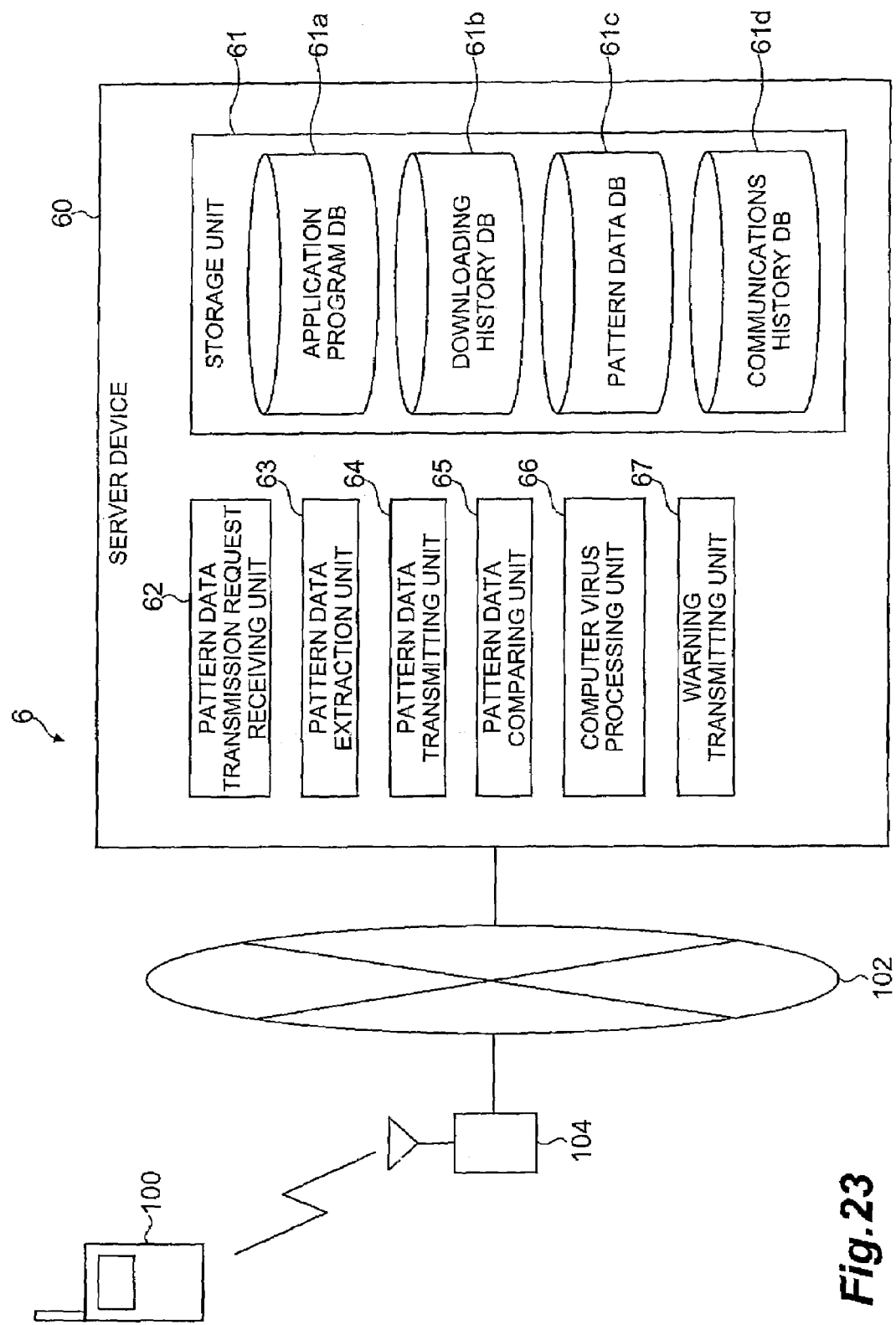
FIG. 23 is a system structural diagram of the information transmitting system of the sixth embodiment.

FIG. 23 is a system structural diagram of the information transmitting system 6 of the present embodiment. The server device 60 of the information transmitting system 6 is a server device which transmits pattern data used for the detection of computer viruses to a portable telephone 100; in functional terms, this server device 60 comprises a storage unit 61 (second storing means), a pattern data transmission request receiving unit 62, a pattern data extraction unit 63 (extraction means), a pattern data transmitting unit 64 (transmitting means), a pattern data comparing unit 65 (detection means), a computer virus processing unit 66, and a warning transmitting unit 67 (second warning transmitting means). Here, the storage unit 61 corresponds to the storage device 10c shown in FIG. 1. Furthermore, the pattern data transmission request receiving unit 62, pattern data extraction unit 63, pattern data transmitting unit 64, pattern data comparing unit 65, computer virus processing unit 66 and warning transmitting unit 67 are realized as a result of software stored in the storage device 10c shown in FIG. 1 being executed by the CPU 10a.

The pattern data transmission request receiving unit 62, pattern data extraction unit 63, pattern data transmitting unit 64, pattern data comparing unit 65 and computer virus processing unit 66 respectively have constructions that are similar to those of the pattern data transmission request receiving unit 42, pattern data extraction unit 43, pattern data transmitting unit 44, pattern data comparing unit 45 and computer virus processing unit 46 of the information transmitting system 4 of the abovementioned fourth embodiment.

An application program database 61a, a downloading history database 61b, a pattern data database 61c and a communications history database 61d are stored in the storage unit 61. The application program database 61a has a construction similar to that of the application program database 41a shown in FIG. 18. FIG. 24 is a structural diagram of the downloading history database 61b. The telephone numbers of portable telephones, the names of application programs that have been downloaded into these portable telephones, and the names of pattern data that have been downloaded into these portable telephones, are stored in association with each other in the downloading history database 61b. The pattern data database 61c has a construction similar to that of the pattern data database 41c shown in FIG. 19. FIG. 25 is a structural diagram of the communications history database 61d. The telephone numbers of portable telephones, and the telephone numbers of correspondent portable telephones that have performed communications with these portable telephones, are stored in association with each other in the communications history database 61d.

Returning to FIG. 23, in cases where it is confirmed by the pattern data comparing unit 65 that a computer virus is contained in a specified application program that has been downloaded into a specified portable telephone 100 and stored in the memory of this portable telephone 100, the warning transmitting unit 67 transmits warnings to other portable telephones that have communicated with the abovementioned specified portable telephone 100 on the basis of the communications history stored in the communications history database 61d of the storage unit 61. The warning transmitting unit 67 also refers to the downloading history database 61b of the storage unit 61, and transmits pattern data used to detect whether or not a computer virus is contained in the abovementioned specified application program to portable telephones (among the abovementioned other portable telephones) that have not yet downloaded this pattern data.

Furthermore, the portable telephone 100 of the information transmitting system 6 has a construction similar to that of the portable telephone 100 of the information transmitting system 1 of the abovementioned first embodiment.

Figure 26:
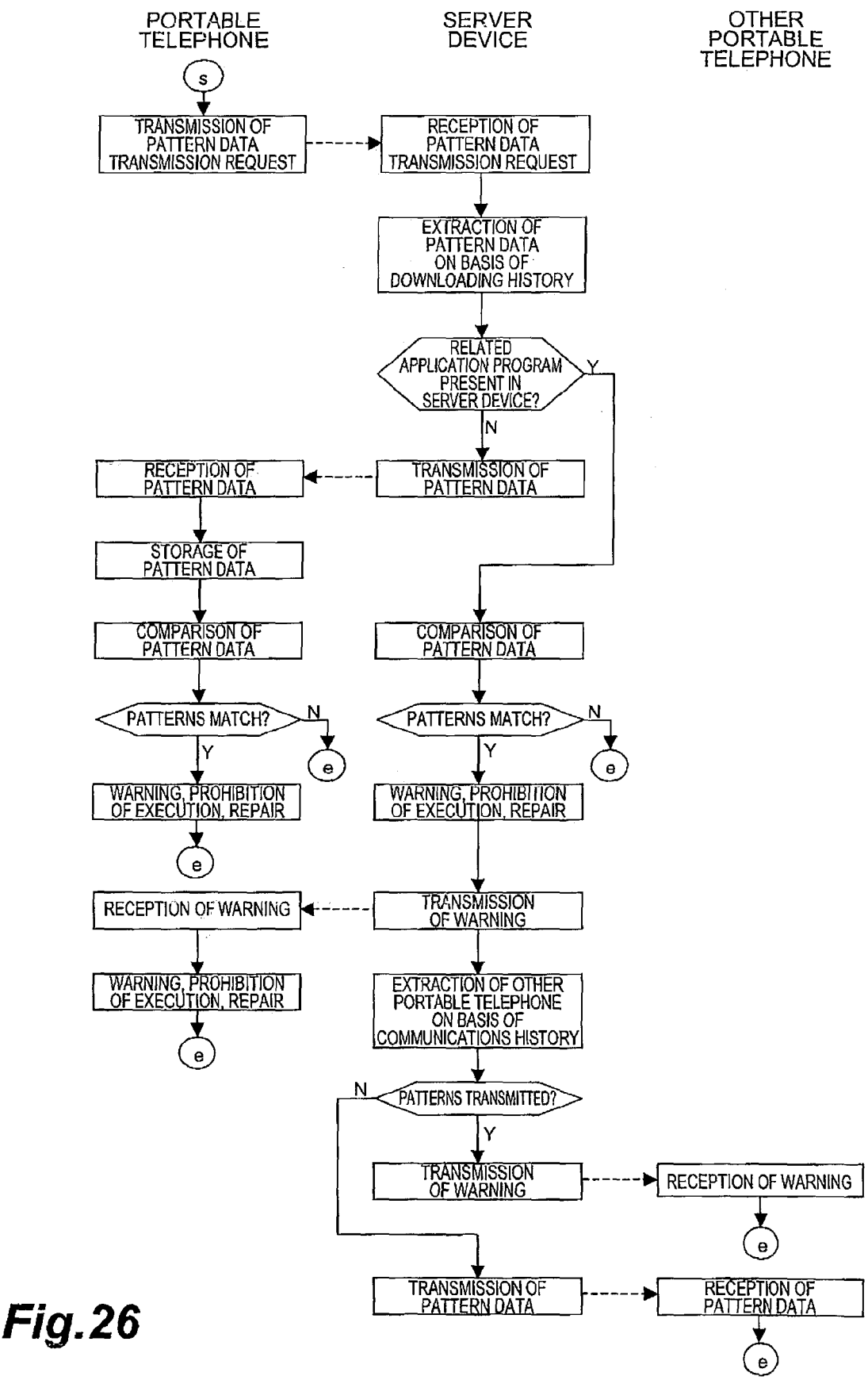
FIG. 26 is a flow chart which shows the flow of the processing of the information transmitting system of the sixth embodiment.

Next, the operation of the information transmitting system of the present embodiment will be described, and an information transmitting method constituting an embodiment of the present invention will also be described. FIG. 26 is a flow chart which shows the operation of the information transmitting system 6 of the present embodiment. The processing of S602 through S626 in the information transmitting system 6 of the present embodiment is similar to the process of S402 through S426 that was described with reference to FIG. 20.

In cases where it is confirmed by the pattern data comparing unit 65 that a computer virus is contained in a specified application program that has been downloaded into the portable telephone 100, a warning is transmitted to this portable telephone 100 (S622), and warnings are also transmitted by the warning transmitting unit 67 to other portable telephones 100 that have communicated with this portable telephone 100. To describe this in greater detail, the communications history database 61d of the storage unit 61 is first searched using the telephone number of the portable telephone 100 as a key, and the telephone numbers of other portable telephones that have communicated with the portable telephone 100 are extracted (S628).

Next, using the extracted telephone numbers as a key, reference is made to the downloading history database 61b of the storage unit 61, and it is detected whether or not pattern data used to detect the presence or absence of a computer virus in the abovementioned specified application program has already been transmitted to the portable telephones having these telephone numbers. In the case of portable telephones to which the abovementioned pattern data has already been transmitted, this pattern data is not transmitted, and a warning indicating that the presence of a computer virus has been detected in the abovementioned specified application program is [instead] transmitted [to these portable telephones] (S630), and is received by these portable telephones (S632). On the other hand, in the case of portable telephones to which the abovementioned pattern data has not yet been transmitted, this pattern data is transmitted along with the abovementioned warning (S634), and is received by these portable telephones (S636). In this case, it would also be possible to devise the system so that instructional information recommending the downloading of the pattern data is transmitted instead of transmitting the pattern data [itself]. Furthermore, it would also be possible to further narrow down the portable telephones that are the object of warning transmission (from the abovementioned extracted portable telephones) on the basis of the model names, maker names, operating system names or the like of the portable telephones.

For example, let us assume that it has been detected that a computer virus is contained in "application program 1" that has been downloaded into a portable telephone 100 having the telephone number of "090-0000-0000". Here, when reference is made to the communications history database 61d shown in FIG. 25, it is found that a portable telephone with the telephone number of "090-0000-0001" and a portable telephone with the telephone number of "090-0000-0002" have communicated with the portable telephone 100 in the past. Next, when reference is made to the downloading history database 61b shown in FIG. 24, it is found that "pattern data 1" used to detect whether or not a computer virus is contained in "application program 1" has already been downloaded into the portable telephone with a telephone number of "090-0000-0001"; accordingly, only a warning is transmitted [to this portable telephone]. On the other hand, it is found that "pattern data 1" used to detect whether or not a computer virus is contained in "application program 1" has not yet been downloaded into the portable telephone with a telephone number of "090-0000-0002"; accordingly, "pattern data 1" is transmitted [to this portable telephone] along with the abovementioned warning.

Next, the effects and merits of the information transmitting system of the present embodiment will be described. Like the information transmitting system 3 of the abovementioned third embodiment, the information transmitting system 6 of the present embodiment also extracts specified pattern data on the basis of the downloading history of application programs in the portable telephone 100, and transmits the specified pattern data that is thus extracted to the portable telephone 100. Accordingly, the quantity of pattern data that is transmitted from the server device 60 to the portable telephone 100, the quantity of pattern data that is stored in the portable telephone 100, and the quantity of data that is compared by the portable telephone 100, can be efficiently reduced in accordance with the application programs that have been downloaded into this portable telephone 100. As a result, the detection of computer viruses in the portable telephone 100 can be accomplished in an efficient manner.

Furthermore, in cases where it is confirmed that a computer virus is contained in a specified application program in a certain portable telephone 100, it is highly possible that this computer virus is also present in other portable telephones that have communicated with this portable telephone 100. In the information transmitting system 6 of the present embodiment, warnings are also transmitted to other portable telephones that have communicated with the abovementioned portable telephone 100 on the basis of the history of communications among a plurality of portable telephones stored in the communications history database of the storage unit 61. Accordingly, a warning can be sent to other portable telephones in which there is a possibility that a computer virus is present. As a result, the other telephones that receive this warning can take early countermeasures against the computer virus in the case of the abovementioned specified application program, so that the spread of the computer virus can be prevented.

In the information transmitting system 6 of the abovementioned embodiment, the presence or absence of a computer virus is detected by the pattern data comparing unit 65 of the server device 6, and the warning transmitting unit 67 transmits warnings to other portable telephones on the basis of the abovementioned detection results. However, it would also be possible to devise this system so that t he portable telephone 100 notifies the server device 60 of the detection results, and the warning transmitting unit 68 transmits warnings to other portable telephones on the basis of this notification.

Seventh Embodiment

Next, an information transmitting system constituting a seventh embodiment of the present invention will be described. Furthermore, the information transmitting system of the present embodiment includes a server device constituting an embodiment of the present invention.

First, the construction of the information transmitting system of the present invention will be described. The hardware construction of the information transmitting system of the present embodiment is similar to the hardware construction of the information transmitting system 1 of the abovementioned first embodiment that was described with reference to FIGS. 1 and 30.

Figure 27:
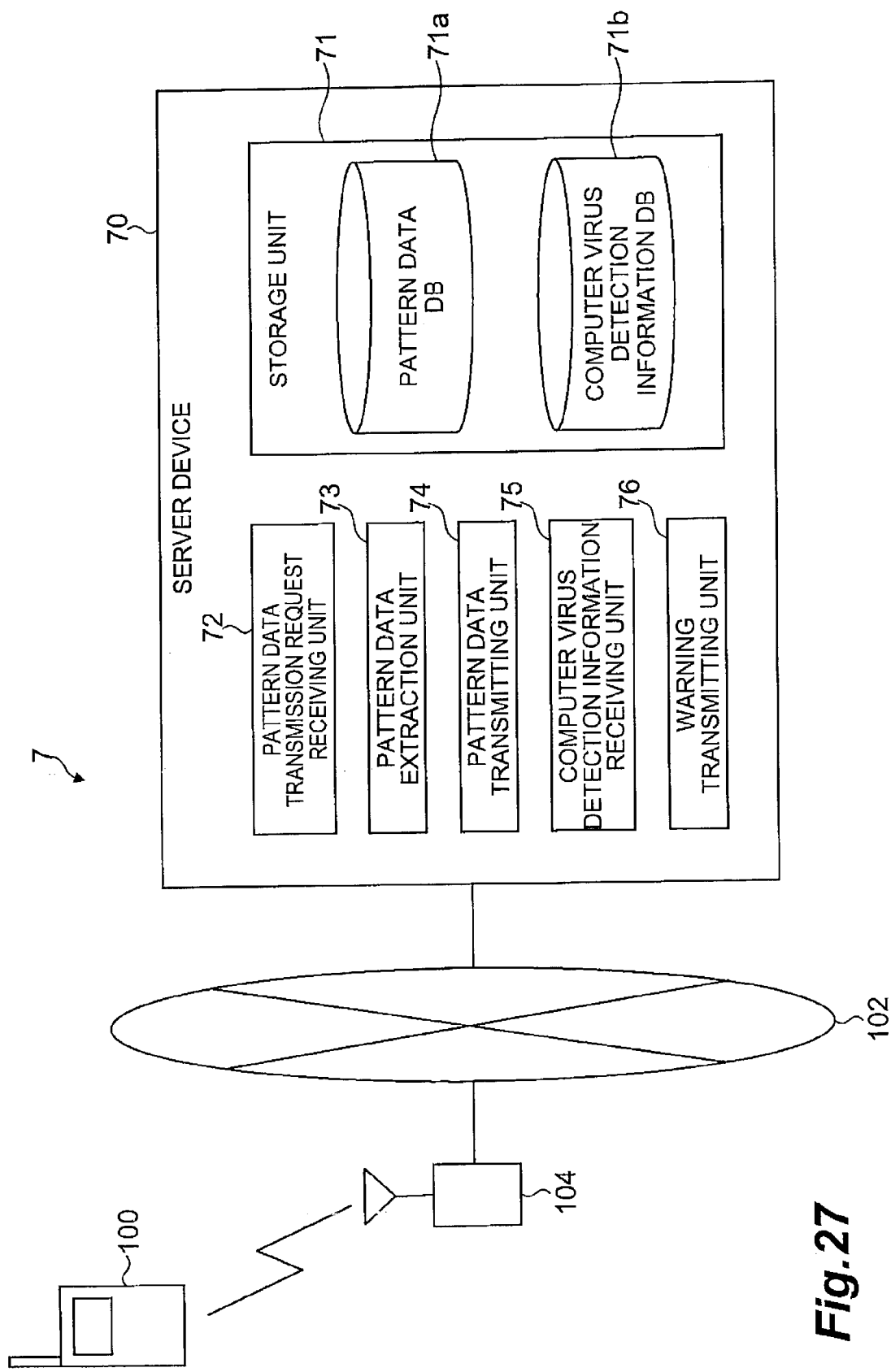
FIG. 27 is a system diagram of the information transmitting system of the seventh embodiment.

FIG. 27 is a system structural diagram of the information transmitting system 7 of the present embodiment. The server device 70 of the information transmitting system 7 is a server device which transmits pattern data used for the detection of computer viruses to a portable telephone 100; in functional terms, this server device 70 comprises a storage unit 71 (third storing means), a pattern data transmission request receiving unit 72, a pattern data extraction unit 73 (extraction means), a pattern data transmitting unit 74 (transmitting means), a computer virus detection information receiving unit 75 (receiving means), and a warning transmitting unit 76 (third warning transmitting means). Here, the storage unit 71 corresponds to the storage device 10c shown in FIG. 1. Furthermore, the pattern data transmission request receiving unit 72, pattern data extraction unit 73, pattern data transmitting unit 74, computer virus detection information receiving unit 75 and report transmitting unit 76 are realized as a result of software stored in the storage device 10c shown in FIG. 1 being executed by the CPU 10a.

The pattern data transmission request receiving unit 72, pattern data extraction unit 73 and pattern data transmitting unit 74 respectively have constructions that are similar to those of the pattern data transmission request receiving unit 12, pattern data extraction unit 13, and pattern data transmitting unit 14 of the information transmitting system 1 of the abovementioned first embodiment.

A pattern data database 71a and a computer virus detection information database 71b are stored in the storage unit 71. The pattern data database 71a has a construction similar to that of the pattern data database 11a that was described with reference to FIG. 3. FIG. 28 is a structural diagram of the computer virus detection information database. The names of pattern data, the number of times that this pattern data has been detected, and preset threshold values for the number of times that the abovementioned pattern data has been detected, are stored in association with each other in the computer virus detection information database 71b.

The computer virus detection information receiving unit 75 receives computer virus detection information which is respective transmitted from each of a plurality of portable telephones, and which indicates that a computer virus has been detected in these portable telephones. Pattern data that has been detected in the abovementioned portable telephones is included in the computer virus detection information. Here, each time that computer virus detection information data is received, the computer virus detection information receiving unit 75 refers to pattern data contained in the computer virus detection information, and adds 1 to the number of times that corresponding pattern data in the computer virus detection information database 71b of the storage unit 71 has been detected.

In cases where the number of times that computer virus detection information has been received by the computer virus detection information receiving unit 75 reaches a number that is equal to or greater than a predetermined fixed number, the warning transmitting unit 76 transmits a warning to portable telephones that are the object of warning transmission. More concretely, in cases where the number of times that pattern data in the computer virus detection information database 71b of the storage unit 71 has been detected reaches a number that is equal to or greater than a preset threshold value, a warning is transmitted to portable telephones that are the object of warning transmission. Here, for example, the term "portable telephones that are the object of warning transmission" may refer to all of the portable telephone for which a utilization agreement has been concluded with the mobile communications business operator, or all of the portable telephones for which an agreement to utilize a computer virus detection service has been concluded.

Furthermore, the portable telephone 100 of the information transmitting system 7 has a construction similar to that of the portable telephone of the information transmitting system 1 of the abovementioned first embodiment.

Figure 29:
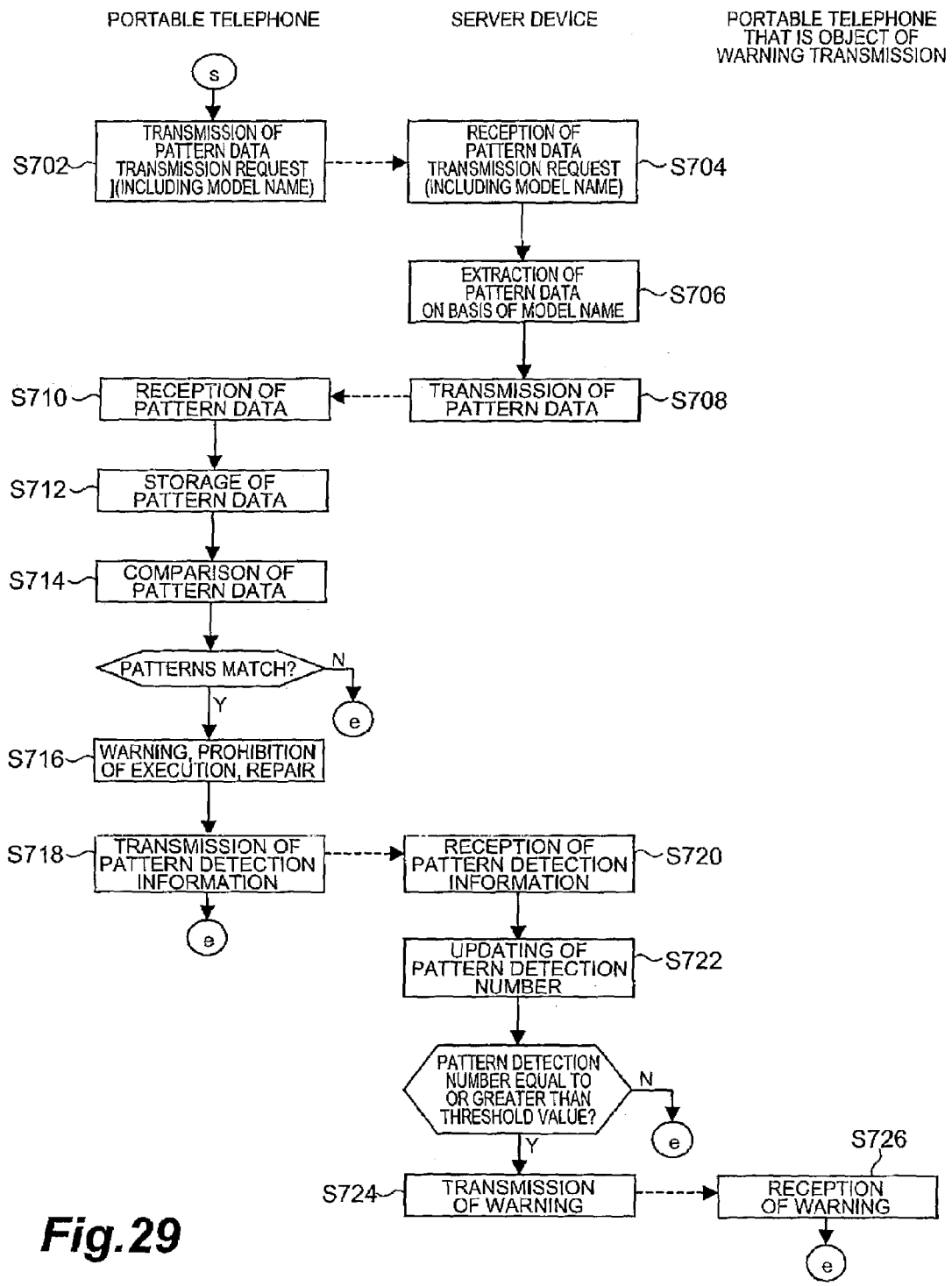
FIG. 29 is a flow chart which shows the flow of the processing of the information transmitting system of the seventh embodiment.

Next, the operation of the information transmitting system of the present embodiment will be described, and an information transmitting system constituting an embodiment of the present invention will also be described. FIG. 29 is a flow chart which shows the operation of the information transmitting system 7 of the present embodiment. The processing of S702 through S716 in the information transmitting system 7 of the present embodiment is similar to the processing of S102 through S116 that was described with reference to FIG. 4.

In the information transmitting system 7 of the present embodiment, furthermore, in cases where the data that is stored in the memory of the portable telephone 100 includes portions that match specified pattern data, computer virus detection information that includes this pattern data is transmitted to the server device 70 from the computer virus processing unit 115 of the portable telephone 100 (S718), and this computer virus detection information is received by the computer virus detection information receiving unit 75 of the server device 70 (S720).

When computer virus detection information is received by the computer virus detection information receiving unit 75, reference is made to the pattern data that is included in the computer virus detection information, and 1 is added to the number of times that corresponding pattern data in the computer virus detection information database 71b of the storage unit 1 has been detected (S722).

Furthermore, the computer virus detection information database 71b of the storage unit 71 is periodically referred to by the warning transmitting unit 76, and in cases where the number of times that pattern data in the computer virus detection information database 71b of the storage unit 71 has been detected reaches a number that is equal to or greater than a threshold value that has been set beforehand for the number of times that this pattern data is detected, a warning is transmitted to portable telephones that are the object of warning transmission (S724). The warnings transmitted from the server device 70 are received by the portable telephones that are the object of warning transmission (S726). In this case, the portable telephones that are the object of warning transmission may be narrowed down on the basis of the model names, operating system names or the like of the portable telephones.

Next, the effects and merits of the information transmitting system of the present embodiment will be described. In the information transmitting system 7 of the present embodiment, as in the information transmitting system 1 of the abovementioned first embodiment, when pattern data used for the detection of computer viruses is transmitted from the server device 70 to the portable telephone 100, specified pattern data is extracted on the basis of the model name of the portable telephone 100 (information that specifies both the hardware and software), and the specified pattern data that is thus extracted is transmitted to the portable telephone 100. Accordingly, the quantity of pattern data that is transmitted from the server device 70 to the portable telephone 100, the quantity of data that is stored in the portable telephone 100, and the quantity of data that is compared by the portable telephone 100, can be efficiently reduced in accordance with the software and hardware of the portable telephone 100. As a result, the detection of computer viruses in the portable telephone 100 can be accomplished in an efficient manner.

Furthermore, in the information transmitting system 7 of the present embodiment, the server device 70 receives computer virus detection information from the portable telephone, and in cases where the number of times that such computer virus detection information data is received reaches a number that is equal to or greater than a predetermined fixed number, a warning is transmitted to portable telephones that are the object of warning transmission. Accordingly, the portable telephones can be warned regarding a widely spread computer virus.

Here, the information transmitting system 7 of the present embodiment extracts specified pattern data on the basis of the model name of the portable telephone 100, and transmits the specified pattern data that is extracted to the portable telephone 100. However, it would also be possible to devise this system so that specified pattern data extracted on the basis of the memory capacity, operating system, downloading history of application programs or the like is transmitted to the portable telephone 100 as described in the respective embodiments described above.

Furthermore, in the information transmitting systems of the respective embodiments described above, it would also be possible to devise the system so that pattern data that has already been utilized by the portable telephone 100 (i.e., pattern data for which comparative processing has been completed) is deleted. By deleting pattern data that has already been utilized, it is possible to utilize the memory of the portable telephone 100 in an effective manner. In regard to the deletion of pattern data, the following aspects maybe indicated. For example, the deletion of pattern data may be performed for a portion of the pattern data rather than for all of the pattern data. Furthermore, the deletion of pattern data may be initiated when an effective deadline set beforehand for the pattern data has passed, or may be initiated after a fixed period of time has elapsed following the completion of comparative processing. Furthermore, the deletion of pattern data may also be initiated by instructions from the server device or by instructions from the user of the portable telephone. Moreover, this deletion may be initiated following the detection of computer viruses or following the completion of repair processing.

Furthermore, the constituent elements of the information transmitting systems of the respective embodiments described above are physically disposed in a single server device; however, it would also be possible to physically disperse these constituent elements among a plurality of server devices. For example, in the server device 20 of the second embodiment, it would be possible to devise the system so that the pattern data extraction unit 23 and terminal information database 21a are present in physically different server devices, and so that the pattern data extraction unit 23 sends inquiries regarding terminal information to physically different server devices.

In the server device, information transmitting system and information transmitting method of the present invention, when pattern data used for the detection of computer viruses is transmitted to a mobile communications terminal, specified pattern data is extracted on the basis of terminal information such as the hardware or software of the mobile communications terminal, the reception history of data in the mobile communications terminal or the like, and the specified pattern data that is thus extracted is transmitted to the mobile communications terminal. Accordingly, the quantity of pattern data that is transmitted from the server device to the mobile communications terminal, the quantity of pattern data that is stored in the mobile communications terminal, and the quantity of pattern data that is compared by the mobile communications terminal, can be efficiently reduced in accordance with the conditions of this mobile communications terminal. As a result, the detection of computer viruses in the mobile communications terminal can be accomplished in an efficient manner.

What is claimed is:

1. A server device which transmits pattern data used for the detection of computer viruses to a mobile communications terminal, said server device comprising:
    an extraction unit configured to extract specified pattern data from a plurality of sets of pattern data based on a terminal information relating to said mobile communications terminal, said terminal information including an identifier configured to identify a hardware feature of said mobile communications terminal;
    a transmitting unit configured to transmit said specified pattern data extracted by said extraction unit to said mobile communications terminal;
    a receiving unit configured to receive computer virus detection information indicating that a computer virus has been detected from said mobile communications terminal; and
    a third warning transmitting unit configured to transmit a warning to mobile communications terminals that are an object of warning transmission in cases where a number of times that computer virus detection information is received by said receiving unit is equal to or greater than a predetermined fixed number.

2. The server device according to claim 1, wherein said terminal information includes information relating to a memory capacity of said mobile communications terminal.

3. The server device according to claim 1, wherein said terminal information includes information relating to a software of said mobile communications terminal.

4. The server device according to claim 3, wherein said terminal information includes information relating to an operating system of said mobile communications terminal.

5. The server device according to claim 3, wherein said terminal information includes information relating to application programs that are stored in said mobile communications terminal.

6. The server device according to claim 1, wherein said terminal information includes information relating to a history of data reception in said mobile communications terminal.

7. The server device according to claim 1, wherein said transmitting unit is further configured to transmit a list of said specified pattern data extracted by said extraction unit to said mobile communications terminal, and to transmit pattern data selected by a user of said mobile communications terminal from said specified pattern data to said mobile communications terminal.

8. The server device according to claim 1, further comprising a detection unit configured to detect whether or not a computer virus is contained in the data present in said server device using the specified pattern data extracted by said extraction unit.

9. The server device according to claim 1, further comprising:
- a first storage unit configured to store information relating to a history of data reception in each of a plurality of mobile communications terminals; and
- a first warning transmitting unit configured to transmit warnings to other mobile communications terminals that have received specified data based on information relating to said history of data reception stored in said first storage unit in cases where it is confirmed that a computer virus is contained in said specified data.

10. The server device according to claim 1, further comprising:
- a second storage unit configured to store information relating to a history of communications among a plurality of mobile communications terminals; and
- a second warning transmitting unit configured to transmit warnings to other mobile communications terminals that have communicated with a specified mobile communications terminal based on information relating to the history of communications stored in said second storage unit in cases where it is confirmed that a computer virus is contained in specified data stored in said specified mobile communications terminal.

11. A mobile communications terminal which receives pattern data used for computer virus detection that is transmitted from a server device, said terminal comprising:
- a first transmitting unit configured to transmit terminal information relating to said mobile communications terminal to said server device, said terminal information including an identifier configured to identify a hardware feature of said mobile communications terminal;
- a first receiving unit configured to receive said pattern data that is extracted in said server device and transmitted on the basis of said terminal information transmitted by said transmitting unit;
- a storage unit configured to store said pattern data that is received by said receiving unit;
- a second transmitting unit configured to transmit computer virus detection information indicating that a computer virus has been detected; and
- a second receiving unit configured to receive a warning from the server device that a number of times that computer virus detection information is received by the server device is equal to or greater than a predetermined fixed number.

12. An information transmitting system comprising:
a mobile communications terminal; and
a server device which transmits pattern data used for the detection of computer viruses to said mobile communications terminal;
wherein said server device is the server device according to claim 1.

13. An information transmitting system comprising:
a mobile communications terminal; and
a server device which transmits pattern data used for the detection of computer viruses to said mobile communications terminal;
wherein said server device is the server device according to claim 1.

14. An information transmitting system comprising:
a mobile communications terminal; and
a server device which transmits pattern data used for the detection of computer viruses to said mobile communications terminal;
wherein said server device is the server device according to claim 2.

15. An information transmitting system comprising:
a mobile communications terminal; and
a server device which transmits pattern data used for the detection of computer viruses to said mobile communications terminal;
wherein said server device is the server device according to claim 3.

16. An information transmitting system comprising:
a mobile communications terminal; and
a server device which transmits pattern data used for the detection of computer viruses to said mobile communications terminal;
wherein said server device is the server device according to claim 4.

17. An information transmitting system comprising:
a mobile communications terminal; and
a server device which transmits pattern data used for the detection of computer viruses to said mobile communications terminal;
wherein said server device is the server device according to claim 5.

18. An information transmitting system comprising:
a mobile communications terminal; and
a server device which transmits pattern data used for the detection of computer viruses to said mobile communications terminal;
wherein said server device is the server device according to claim 6.

19. An information transmitting system comprising:
a mobile communications terminal; and
a server device which transmits pattern data used for the detection of computer viruses to said mobile communications terminal;
wherein said server device is the server device according to claim 7.

20. An information transmitting system comprising:
a mobile communications terminal; and
a server device which transmits pattern data used for the detection of computer viruses to said mobile communications terminal;
wherein said server device is the server device according to claim 8.

21. An information transmitting system comprising:
a mobile communications terminal; and
a server device which transmits pattern data used for the detection of computer viruses to said mobile communications terminal;
wherein said server device is the server device according to claim 9.

22. An information transmitting system comprising:
a mobile communications terminal; and
a server device which transmits pattern data used for the detection of computer viruses to said mobile communications terminal;
wherein said server device is the server device according to claim 10.

23. An information transmitting system comprising:
a mobile communications terminal; and
a server device which transmits pattern data used for the detection of computer viruses to said mobile communications terminal;
wherein said server device is the server device according to claim 1.

24. An information transmitting system comprising:
a mobile communications terminal; and
a server device which transmits pattern data used for the detection of computer viruses to said mobile communications terminal;
wherein said mobile communications terminal comprises,
means for transmitting terminal information relating to said mobile communications terminal to said server device, said terminal information including an identifier configured to identify a hardware feature of said mobile communications terminal,
means for receiving said pattern data, said pattern data being extracted in said server device and transmitted based on said terminal information transmitted by said transmitting means, and
storing means for storing said pattern data received by said receiving means; and
said server device is the server device according to claim 1.

25. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 1.

26. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 2.

27. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 3.

28. An information transmitting system comprising;
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 4.

29. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 5.

30. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and storing means for storing said pattern data received by said receiving means; and said server device is the server device according to claim 6.

31. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 7.

32. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 8.

33. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 9.

34. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 10.

35. An information transmitting system comprising:
a mobile communications terminal; and
a server device which transmits pattern data used for the detection of computer viruses to said mobile communications terminal;
wherein said mobile communications terminal comprises
transmitting means for transmitting terminal information relating to said mobile communications terminal to said server device, said terminal information including an identifier configured to identify a hardware feature of said mobile communications terminal,
receiving means for receiving said pattern data, said pattern data being extracted in said server device and transmitted based on said terminal information transmitted by said transmitting means, and
storing means for storing said pattern data received by said receiving means; and
said server device is the server device according to claim 1.

36. An information transmitting method in which pattern data used for the detection of computer viruses is transmitted from a server device to a mobile communications terminal, comprising:
extracting specified pattern data from a plurality of sets of pattern data at said server device based on terminal information relating to said mobile communications terminal, said terminal information including an identifier configured to identify a hardware feature of said mobile communications terminal;
transmitting said specified pattern data extracted in said extracting to said mobile communications terminal from said server;
receiving, at said server device, computer virus detection information indicating that a computer virus has been detected from said mobile communications terminal; and
transmitting, from said server device, a warning to mobile communications terminals that are an object of warning transmission in cases where a number of times that computer virus detection information is received in said receiving is equal to or greater than a predetermined fixed number.

37. The information transmitting method according to claim 36, wherein said terminal information includes information relating to a memory capacity of said mobile communications terminal.

38. The information transmitting method according to claim 36, wherein said terminal information includes information relating to a software of said mobile communications terminal.

39. The information transmitting method according to claim 38, wherein said terminal information includes information relating to an operating system of said mobile communications terminal.

40. The information transmitting method according to claim 38, wherein said terminal information includes information relating to application programs that are stored in said mobile communications terminal.

41. The information transmitting method according to claim 36, wherein said terminal information includes information relating to a history of data reception in said mobile communications terminal.

42. The information transmitting method according to claim 36, wherein said transmitting further comprises transmitting a list of said specified pattern data extracted in said extracting to said mobile communications terminal from said server device, and transmitting pattern data selected by a user of said mobile communications terminal from said specified pattern data to said mobile communications terminal from said server device.

43. The information transmitting method according to claim 36, further comprising detecting at said server device whether or not a computer virus is contained in data present in said server device using the specified pattern data extracted in said extracting.

44. The information transmitting method according to claim 36, further comprising storing information relating to a history of data reception in each of a plurality of mobile communications terminals in a storage device, and transmitting a warning from said server device to other mobile communications terminals that have received specified data based on the information relating to said history of data reception stored in said storage device in cases where it is confirmed that a computer virus is contained in said specified data.

45. The information transmitting method according to claim 36, further comprising storing information relating to a history of communications among a plurality of mobile communications terminals in a storage device, and transmitting a warning from the server device to other mobile communications terminals that have communicated with a specified mobile communications terminal based on the information relating to the history of communications stored in said storage device in cases where it is confirmed that a computer virus is contained in the specified data stored in said specified mobile communications terminal.

* * * * *